United States Patent
Sasaki et al.

(10) Patent No.: US 7,447,354 B2
(45) Date of Patent: Nov. 4, 2008

(54) IMAGE TRANSMITTER, IMAGE RECEIVER, AND IMAGE TRANSMITTING SYSTEM

(75) Inventors: Hisashi Sasaki, Kanagawa (JP);
Masayuki Hachiuma, Kanagawa (JP);
Tooru Arai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 662 days.

(21) Appl. No.: 11/091,895

(22) Filed: Mar. 29, 2005

(65) Prior Publication Data
US 2005/0226500 A1     Oct. 13, 2005

(30) Foreign Application Priority Data
Mar. 30, 2004  (JP)  .............................. 2004-100545

(51) Int. Cl.
*G06K 9/00* (2006.01)
*G06K 9/36* (2006.01)
*H04L 5/12* (2006.01)
*H04L 25/34* (2006.01)

(52) U.S. Cl. .................. 382/166; 382/238; 375/264; 375/288

(58) Field of Classification Search ............... 382/166, 382/238, 247; 375/264, 286–288, 292, 293
See application file for complete search history.

(56) References Cited

U.S. PATENT DOCUMENTS

| 5,028,995 A * | 7/1991 | Izawa et al. ............ 375/240.12 |
| 6,344,850 B1 | 2/2002 | Okumura et al. |
| 6,553,535 B1 * | 4/2003 | Asada et al. ................. 375/269 |
| 2003/0164811 A1 | 9/2003 | Kim et al. |

FOREIGN PATENT DOCUMENTS

| JP | 55-26714 | 2/1980 |
| JP | 4-21274 | 1/1992 |
| JP | 2003-316338 | 11/2003 |

OTHER PUBLICATIONS

Wei-Chung Cheng, et al., "Chromatic Encoding: a Low Power Encoding Technique for Digital Visual Interface", IEEE/ACM, 2003, 6 Pages.
U.S. Appl. No. 11/375,238, filed Mar. 15, 2006, Sasaki.
U.S. Appl. No. 11/483,277, filed Jul. 10, 2006, Sasaki et al.
K. Wayne Current, "Current-Mode CMOS Multiple-Valued Logic Circuits", IEEE Journal of Solid-State Circuits, vol. 29, No. 2, Feb. 28, 1994, pp. 95-107.
Wei-Chung Cheng, et al., "Chromatic Encoding: a Low Power Encoding Technique for Digital Visual Interface", IEEE Transactions on Consumer Electronics, vol. 50, No. 1, Feb. 29, 2004, pp. 320-328.

* cited by examiner

*Primary Examiner*—Colin M LaRose
(74) *Attorney, Agent, or Firm*—Oblon, Spivak, McClelland, Maier & Neustadt, P.C.

(57) ABSTRACT

An image transmitter, comprising: a color difference differential calculating unit configured to calculate color difference differential data relating to a difference between a current predicting value predicted based on a previous image data and current actual image data; a coding unit configured to code the color difference differential data to generate coding data; a multi-valuation unit configured to generate multi-valued data based on the coding data and an occurrence probability of the coding data based on statistical properties of the image data; and a transmitting unit configured to transmit the multi-valued data via at least one transmission line.

17 Claims, 39 Drawing Sheets

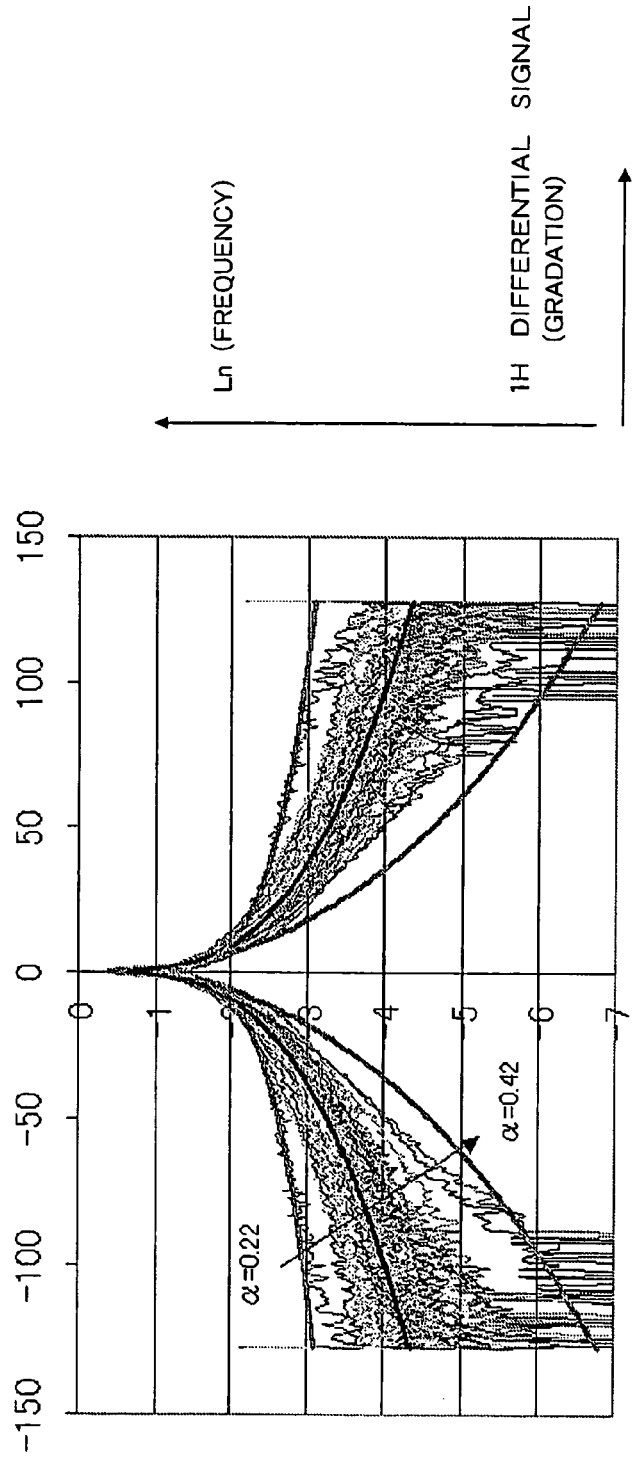
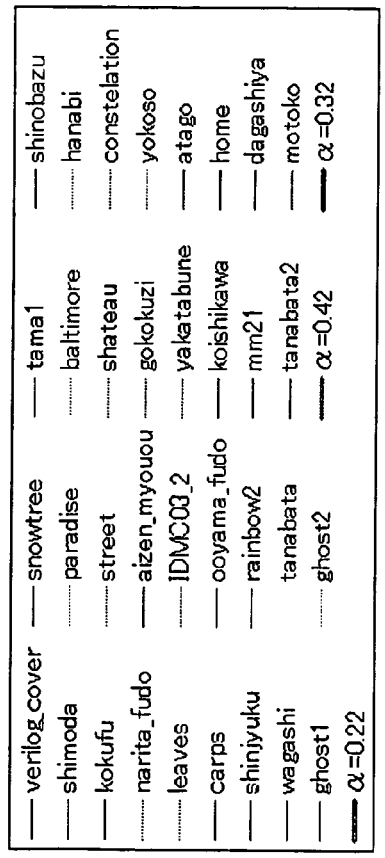
FIG. 5

FIG. 11 DISTRIBUTION OF PARAMETER α (LEFT)

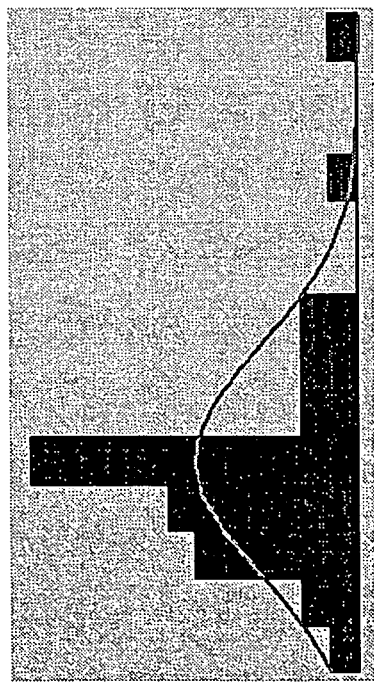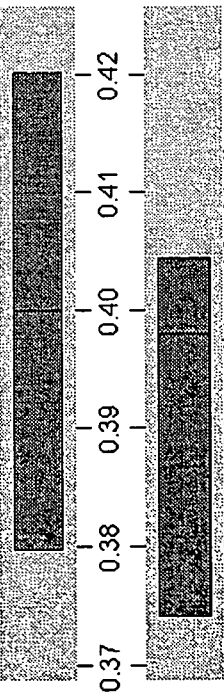
FIG. 12
DISTRIBUTION OF PARAMETER α
(PASSING THROUGH ORIGIN, RIGHT)
Variable: alpha3
Anderson-Darling Normality Test
A-Squared:   1.480
P-Value:     0.001
Mean         0.399942
StDev        0.059976
Variance     3.60E-03
Skewness     1.73482
Kurtosis     4.62747
N            36
Minimum      0.302645
1st Quartile 0.358896
Median       0.397871
3rd Quartile 0.410165
Maximum      0.617076
95% Confidence Interval for Mu
0.379649     0.420235
95% Confidence Interval for Sigma
0.048646     0.078235
95% Confidence Interval for Median
0.373962     0.404328

FIG. 13 DISTRIBUTION OF PARAMETER α (PASSING THROUGH ORIGIN, LEFT)

MED PREDICTOR OF JPEG-LS
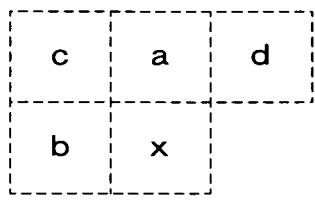
```
if (c ≧ max (a, b) )  /* Edge */
    x̂ = min (a, b) ;
else    if (c ≦ min (a, b) )  /* Edge */
    x̂ = max (a, b) ) ;
else    /* Non_Edge */
    x̂ = a + b − c ;
```
F I G. 14

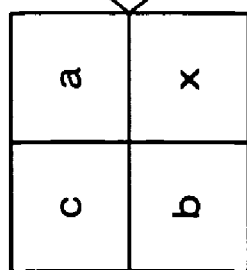
MED
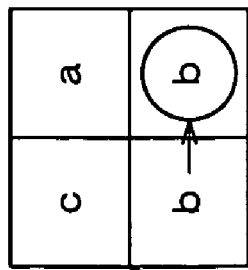
FIG. 15A
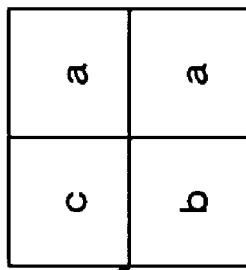
FIG. 15B

MED OF EDIRISINGHE

```
if (c ≧ max (a, b) )
    { if ( (c - max (a, b) ) > T₁ AND   (abs (a-b) ≦ T₂ )
      x̂ = b + d - a ;      DIAGONAL EDGE
      else
      x̂ = min (a, b) ;     HORIZONTAL AND VERTICAL    EDGES
    }
if (c ≦ min (a, b) )
    { if ( (min (a, b) - c) > T₁ AND   (abs (a-b) ≦ T₂ ) )
      x̂ = b + d - a ;      DIAGONAL EDGE
      else
      x̂ = max (a, b) ;     HORIZONTAL AND VERTICAL    EDGES
    }
else
    x̂ = a + b - c ;        FLAT
endif
```

F I G. 16

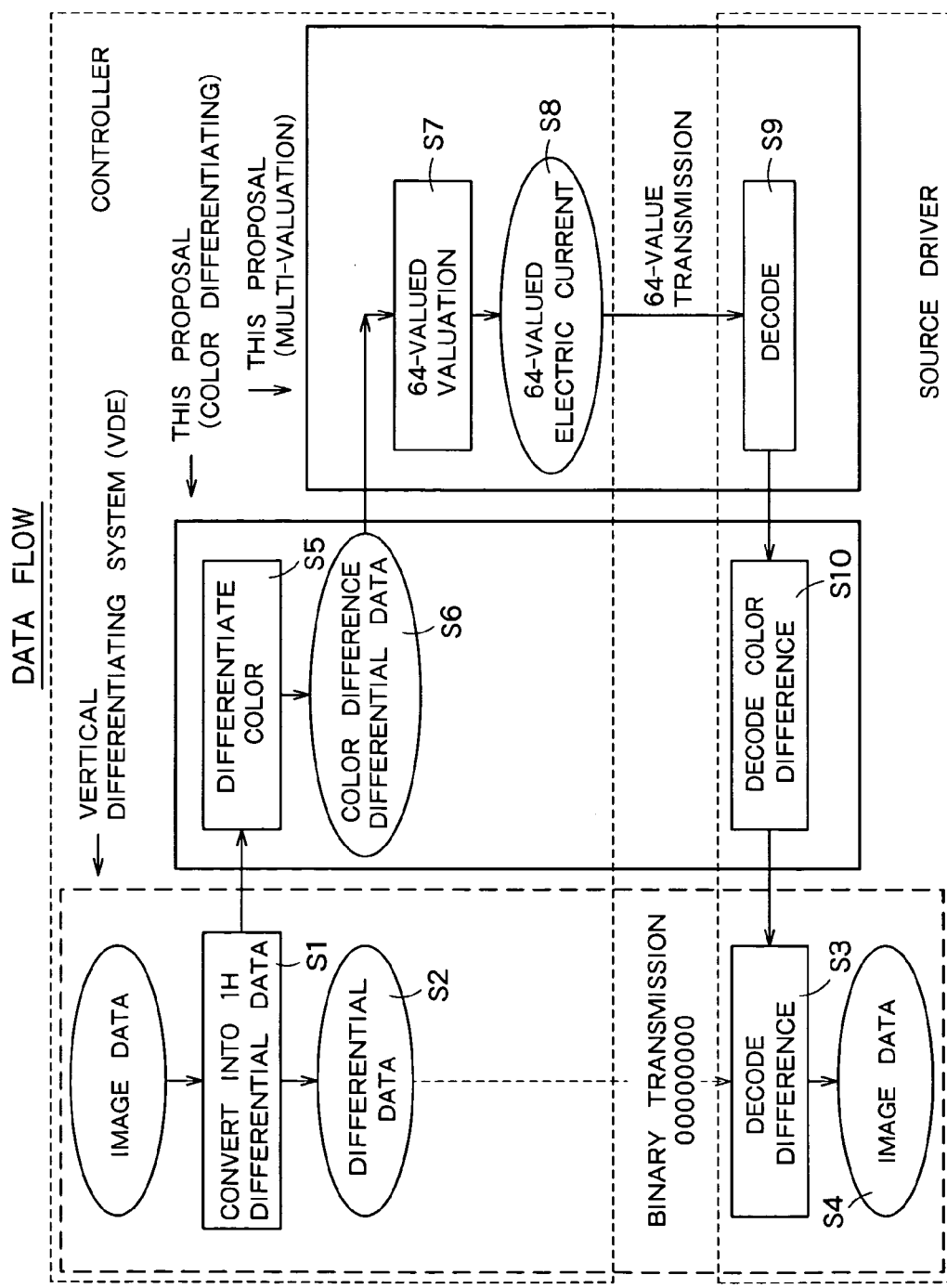
F I G. 22

MAP FROM DIFFERENCE ε
TO BIT STRING Δ

| DIFFERENCE ε | Δ0 | Δ1 | Δ2 | Δ3 | Δ4 | Δ5 | Δ6 | Δ7 | PROBABILITY p(ε) |
|---|---|---|---|---|---|---|---|---|---|
| 0 | 0 | 0 | 0 | 0 | 0 | 0 | 0 | 0 | p(0) |
| 1 | 1 | 0 | 0 | 0 | 0 | 0 | 0 | 0 | p(1) |
| −1 | 0 | 1 | 0 | 0 | 0 | 0 | 0 | 0 | p(−1) |
| 2 | 1 | 1 | 0 | 0 | 0 | 0 | 0 | 0 | p(2) |
| −2 | 0 | 0 | 1 | 0 | 0 | 0 | 0 | 0 | p(−2) |
| 3 | 1 | 0 | 1 | 0 | 0 | 0 | 0 | 0 | p(3) |
| −3 | 0 | 1 | 1 | 0 | 0 | 0 | 0 | 0 | p(−3) |
| 4 | 1 | 1 | 1 | 0 | 0 | 0 | 0 | 0 | p(4) |
| ... | | | | ~ | | | | | |

FOR EXAMPLE, THE PROBABILITY $\phi$(Δ0) OF Δ0=1 IS
OBTAINED BY p(1)+p(2)+p(3)+p(4)+⋯+p(127)

THIS CODE LIST IS APPLIED TO G, R−G AND B−G RESPECTIVELY

F I G. 25

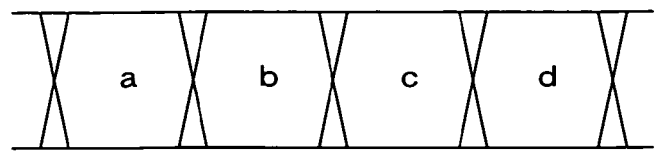
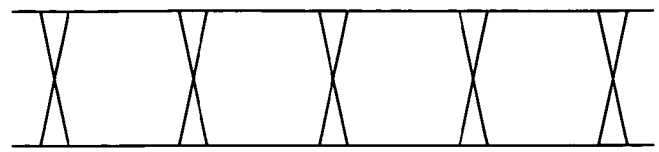
F I G. 28
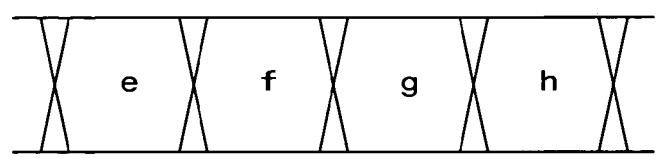
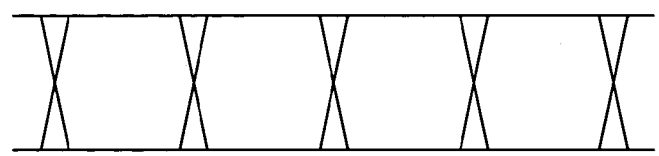
F I G. 29
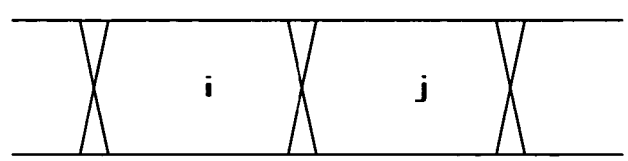
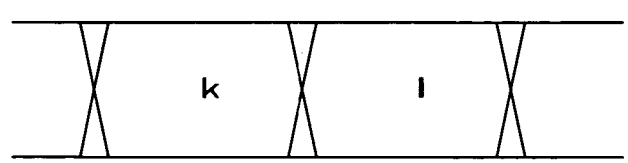
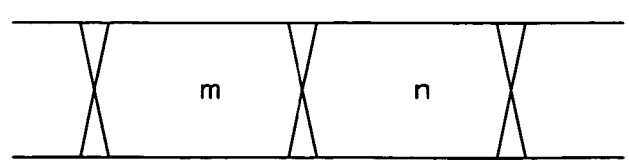
F I G. 30

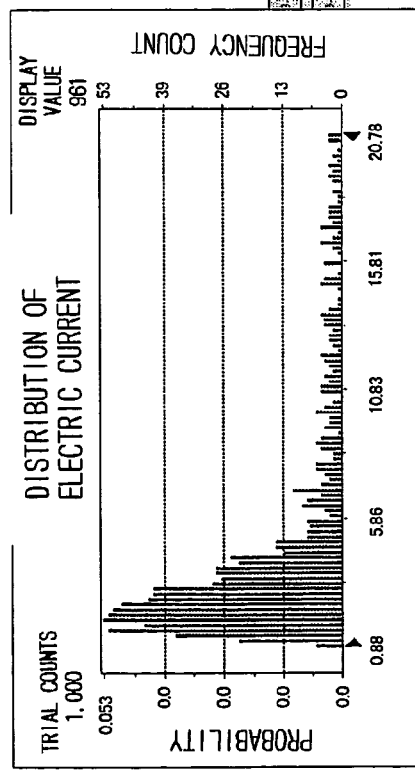
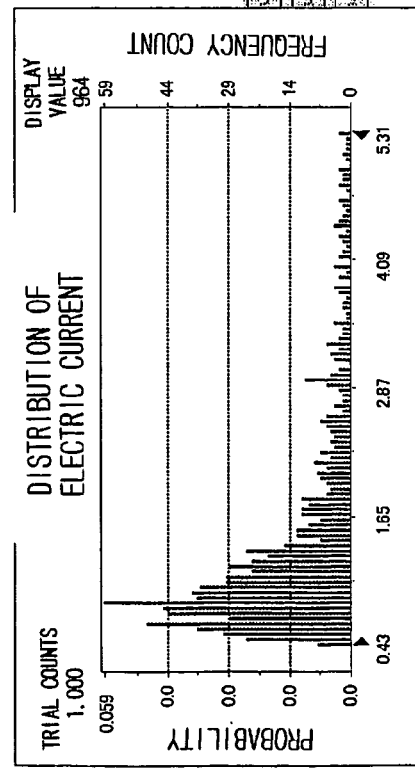
FIG. 31 MONTE CALRO ANALYSIS : DISTRIBUTION OF ELECTRIC CURRENT

EXPECTED VALUE OF ELECTRIC CURRENT

EXPECTED VALUE OF ELECTRIC CURRENT = [Φ(1) + ... + Φ(6)] / 6

Φ(1) = Φ(ΔG0)          +2*Φ(Δ(B-G)3) +4*Φ(Δ(B-G)3) +8*Φ(Δ(R-G)7)
Φ(2) = Φ(ΔG1)          +2*Φ(ΔG4)     +4*Φ(ΔG5)      +8*Φ(Δ(B-G)7)
Φ(3) = Φ(ΔG2)          +2*Φ(Δ(R-G)2) +4*Φ(Δ(R-G)3) +8*Φ(Δ(R-G)6)
Φ(4) = Φ(Δ(B-G)0) +2*Φ(Δ(B-G)2) +4*Φ(Δ(B-G)4) +8*Φ(Δ(B-G)6)
Φ(5) = Φ(Δ(R-G)0) +2*Φ(ΔG3)     +4*Φ(ΔG6)      +8*Φ(Δ(R-G)5)
Φ(6) = Φ(Δ(B-G)0) +2*Φ(Δ(R-G)1) +4*Φ(ΔG7)      +8*Φ(Δ(B-G)5)

F I G. 33

TABLE OF AVERAGE VALUE OF ELECTRIC CURRENT

THE NUMBER OF WIRINGS IS REDUCED FROM 24 (12 PAIRS) TO SIX (3 PAIRS), SO THAT THE ELECTRIC CURRENT IS FURTHER REDUCED.

|  | NATURE | INDOOR, PEOPLE | ANIMATED CARTOON | PC OPERATION |
|---|---|---|---|---|
| TV | IMAGE B<br>13.4mA (59%) | IMAGE C 11.6mA (48%)<br>IMAGE D 16.1mA (67%) | IMAGE E<br>12.0mA (50%) | — |
| PC | IMAGE H<br>31.2mA (130%) | IMAGE C, D, F<br>America 31.2mA | — | IMAGE A<br>8.8mA (36%) |
| CAMERA | IMAGE H<br>31.2mA (130%) | IMAGE F, 16.3mA (68%)<br>IMAGE G 31.2mA | — | — |
| CELLULAR PHONE | IMAGE H<br>IMAGE B | IMAGE C, D, F | IMAGE E | IMAGE A<br>8.8mA (36%) |

F I G. 34

DISTRIBUTION OF ELECTRIC CURRENT BY IMAGE SET ANALYSIS

IMAGE A SET

Anderson-Darling Normality Test
A-Squared: 0.491
P-Value: 0.183

Mean 0.181885
StDev 0.062908
Variance 3.96E-03
Skewness 0.826624
Kurtosis 1.25641
N 14

Minimum 0.103446
1st Quartile 0.125635
Median 0.196369
3rd Quartile 0.212970
Maximum 0.334089

95% Confidence Interval for Mu
0.145563    0.218207

95% Confidence Interval for Sigma
0.045605    0.101347

95% Confidence Interval for Median
0.128271    0.212966

HORIZONTAL AXIS =
UNIT OF ELECTRIC
CURRENT IS 4 mA

DISTRIBUTION OF ELECTRIC CURRENT BY IMAGE SET ANALYSIS
IMAGE C SET
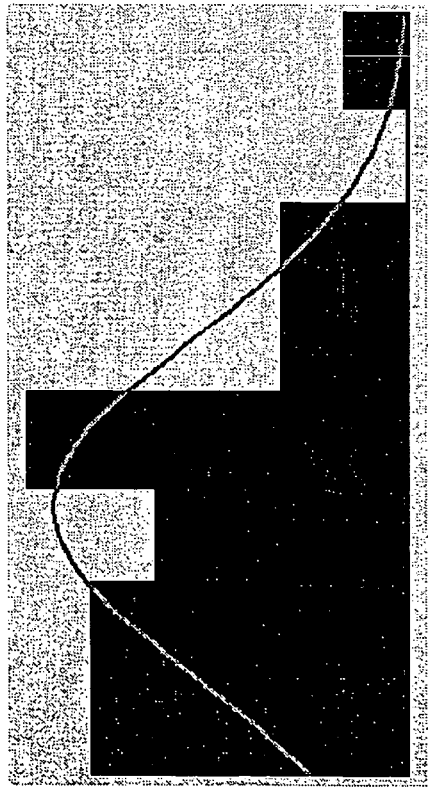
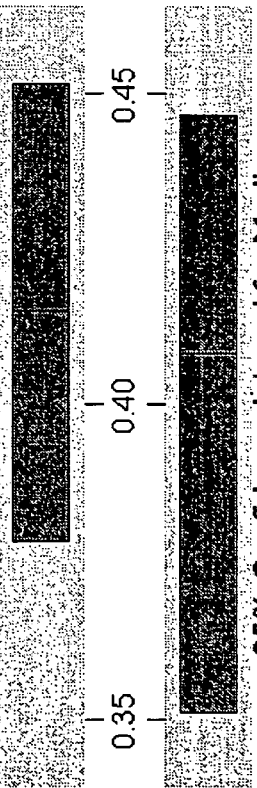
Anderson-Darling Normality Test
A-Squared: 0.469
P-Value: 0.228
Mean       0.414974
StDev      0.088568
Variance   7.84E-03
Skewness   0.820399
Kurtosis   0.290085
N          25
Minimum       0.308269
1st Quartile  0.337136
Median        0.408246
3rd Quartile  0.460997
Maximum       0.641002
95% Confidence Interval for Mu
0.378415    0.451533
95% Confidence Interval for Sigma
0.069156    0.123212
95% Confidence Interval for Median
0.350911    0.446272
F I G. 37

DISTRIBUTION OF ELECTRIC CURRENT BY IMAGE SET ANALYSIS
IMAGE D SET
Anderson-Darling Normality Test
A-Squared: 0.529
P-Value: 0.163
Mean 0.457725
StDev 0.089172
Variance 7.95E-03
Skewness 0.305201
Kurtosis -3.8E-01
N 30
Minimum 0.278081
1st Quartile 0.385719
Median 0.442282
3rd Quartile 0.525374
Maximum 0.667069
95% Confidence Interval for Mu
0.424428  0.491023
95% Confidence Interval for Sigma
0.071017  0.119876
95% Confidence Interval for Median
0.393564  0.517238
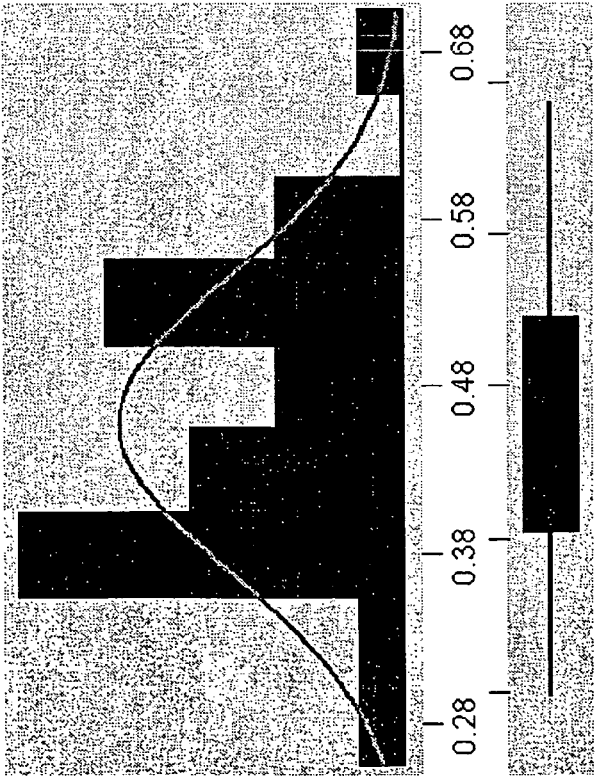
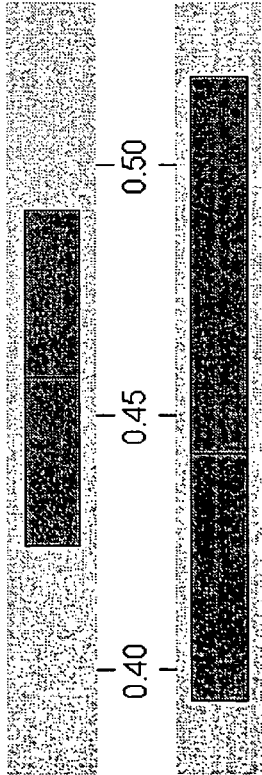
F I G. 38

DISTRIBUTION OF ELECTRIC CURRENT BY IMAGE SET ANALYSIS
IMAGE E SET
Anderson-Darling Normality Test
A-Squared: 0.357
P-Value: 0.443
Mean         0.451062
StDev        0.085578
Variance     7.32E-03
Skewness     0.427760
Kurtosis     0.556476
N            52
Minimum      0.254465
1st Quartile 0.389933
Median       0.446238
3rd Quartile 0.509535
Maximum      0.678847
95% Confidence Interval for Mu
0.427237    0.474887
95% Confidence Interval for Sigma
0.071718    0.106128
95% Confidence Interval for Median
0.420064    0.473971
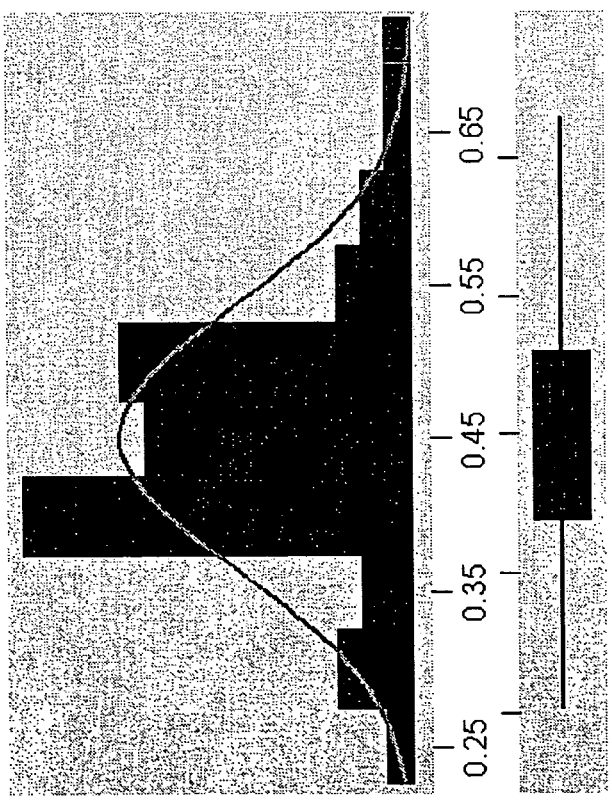
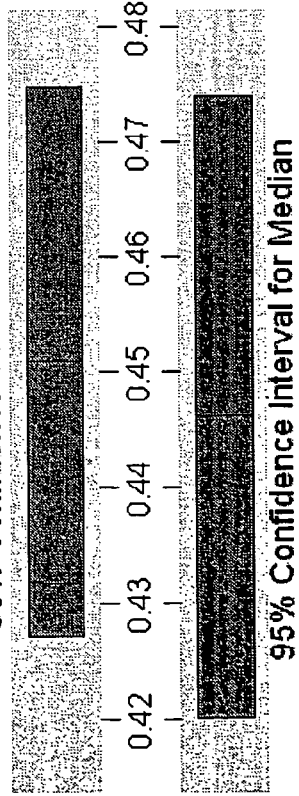
FIG. 39

DISTRIBUTION OF ELECTRIC CURRENT BY IMAGE SET ANALYSIS
IMAGE F SET
Anderson-Darling Normality Test
A-Squared:  0.611
P-Value:    0.103
Mean        0.810982
StDev       0.364530
Variance    0.132882
Skewness    0.755639
Kurtosis    -1.0E-01
N           32
Minimum       0.26943
1st Quartile  0.50895
Median        0.71340
3rd Quartile  1.04486
Maximum       1.69342
95% Confidence Interval for Mu
0.67956    0.94241
95% Confidence Interval for Sigma
0.29224    0.48463
95% Confidence Interval for Median
0.60916    0.90313
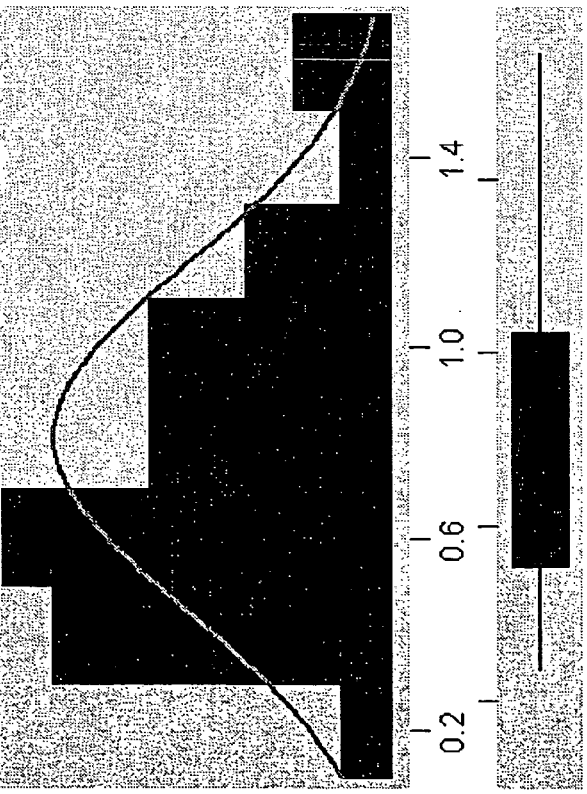
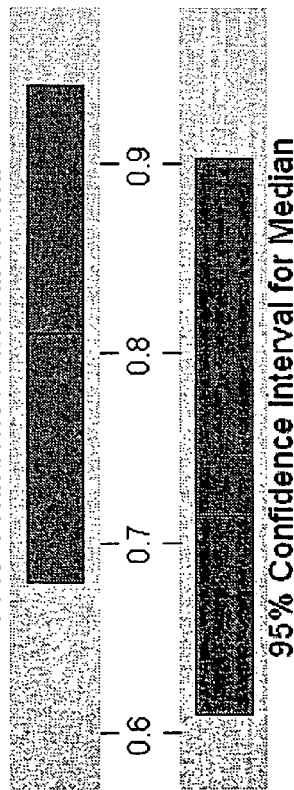
F I G. 40

DISTRIBUTION OF ELECTRIC CURRENT BY IMAGE SET ANALYSIS
IMAGE G SET
Anderson-Darling Normality Test
A-Squared: 0.795
P-Value: 0.038
Mean       1.97745
StDev      0.47107
Variance   0.221912
Skewness   0.228057
Kurtosis   0.259819
N          100
Minimum       1.01179
1st Quartile  1.66760
Median        1.99863
3rd Quartile  2.18359
Maximum       3.35200
95% Confidence Interval for Mu
1.88398   2.07092
95% Confidence Interval for Sigma
0.41361   0.54724
95% Confidence Interval for Median
1.90974   2.08603
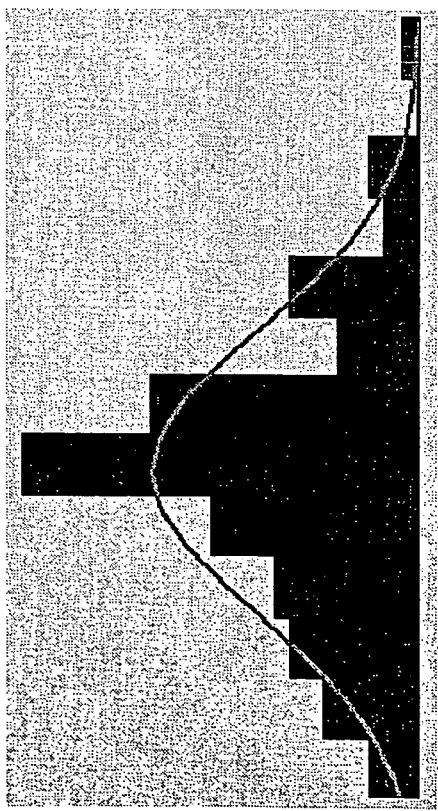
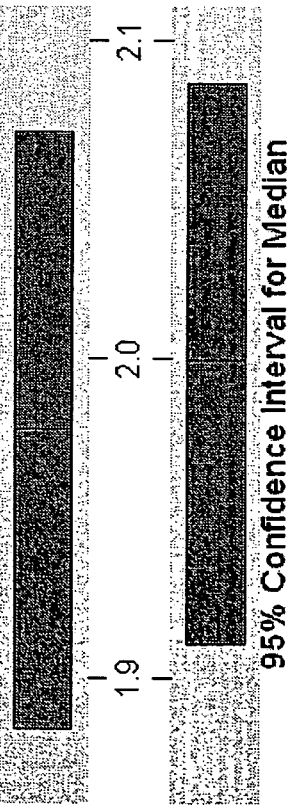
FIG. 41

DISTRIBUTION OF ELECTRIC CURRENT BY IMAGE SET ANALYSIS
IMAGE H SET
Anderson-Darling Normality Test
A-Squared: 0.185
P-Value: 0.905
Mean        2.05426
StDev       0.80179
Variance    0.642863
Skewness    -2.3E-02
Kurtosis    -3.6E-01
N           72
Minimum      0.44083
1st Quartile 1.44655
Median       2.09748
3rd Quartile 2.59661
Maximum      4.09185
95% Confidence Interval for Mu
1.86585     2.24267
95% Confidence Interval for Sigma
0.68885     0.95936
95% Confidence Interval for Median
1.79757     2.37469
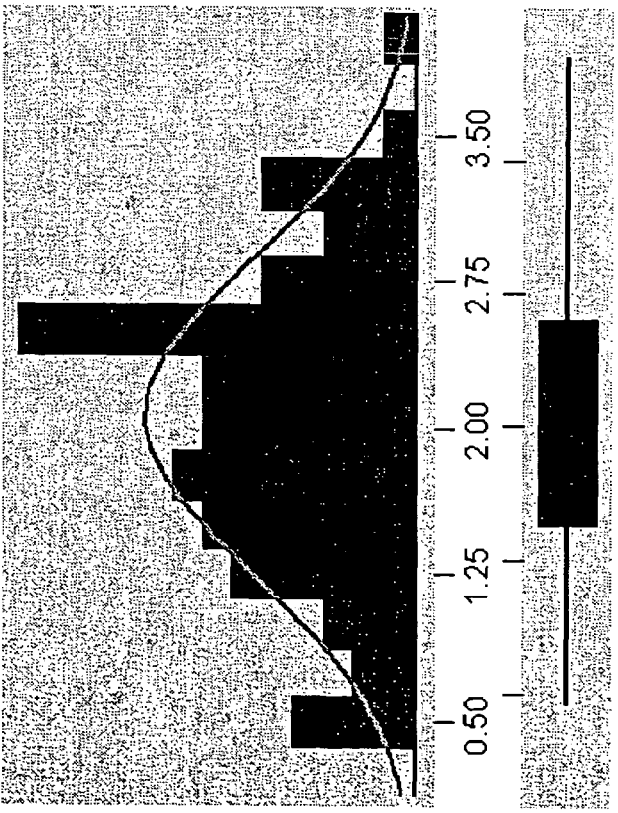
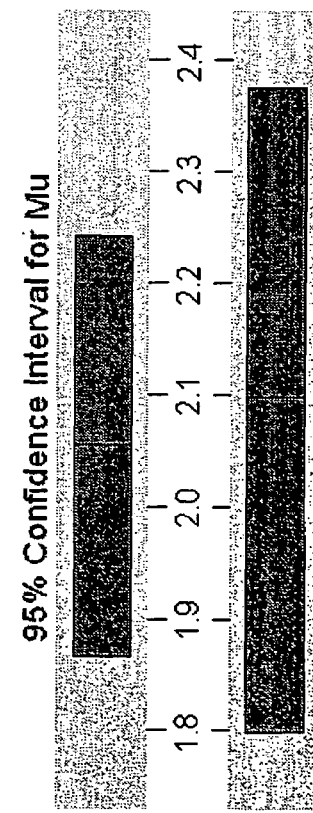
F I G. 42

IMAGE TRANSMITTER, IMAGE RECEIVER, AND IMAGE TRANSMITTING SYSTEM

CROSS REFERENCE TO RELATED APPLICATIONS

This application is based upon and claims the benefit of priority from the prior Japanese Patent Application No. 2004-100545, filed on Mar. 30, 2004, the entire contents of which are incorporated herein by reference.

BACKGROUND OF THE INVENTION

1. Field of the Invention

The present invention relates to an image transmitter, an image receiver and an image transmitting system that transmit or receive image data.

2. Related Art

In order to treat image data having high accuracy and high quality, it is necessary to transmit large volumes of image data. Since it is difficult to transmit large volumes of data by using single wiring, a plurality of wirings is actually used. When there are a number of wirings, the wiring area becomes larger, and a mounting cost of a printed wiring board increases.

In order to solve such a problem, a technology is discussed as the future problem ("AMLCD Manufacturing Technology" by S. S. Kim, pp. M-4/24 and M-4/26, in SID (Society for Information Display) Seminar (May 19, Baltimore, Md.) of the SID 2003, and "LCD television, The future Looks Bright for LCD TV, Information Display (Official Monthly Publication of SID)", October 2003 Vol. 19, No. 10, FIG. 4 on page 13 by Joe Virginia). These discussed about the reduction of count of wirings to reduce the production cost.

Many interfaces are proposed as the data transmitting technology of countermeasure against EMI: for example, RSDS (Reduced Swing Differential Signaling), mini-LVDS (Low Voltage Differential Signaling), CMADS (Current Mode Advanced Differential Signaling), whisper BUS, Mobile-CMADS, MSDL (Mobile Shrink Data Link), MPL (Mobile Pixel Link), MVL (Mobile Video Interface).

These interfaces are proposed for reducing EMI. In these interfaces, its data size still cannot be efficiently reduced, because its image is transmitted in its original form of data without exploiting image correlation. The following papers are known in the society SID (Society for Information Displays): the paper about RSDS by Lee (see Integrated TFT-LCD Timing Controllers with RSDS Column Driver Interface, SID Digest 6.2, 1999), the paper about CMADA by Yusa (see High-Speed I/F for TFT-LCD Source Driver IC by CMADS, SID Digest. 9.4, 2001), and the paper by McCartney (see also the related art Japanese Patent Application Laid-Open No. 2003-44017). Further, the article is also published, which discussed the pros and cons about serial interfaces for cellular phones (see Whisper BUS: An Advanced Interconnect Link For TFT Column Driver Data, SID Digest. 9.3, 2001). Many interfaces such as Mobile-CMADS, MSDL, MPL and MVI are also developed for cellular phones.

Since image has less count of pixels at the present time, a count of wirings are successfully managed in reduction by devising something focusing only on circuits. However, this kind of devising is merely a short-term countermeasure by the following concern: as a count of pixels increases in future, the devising on circuit will be reached to its critical limit caused by the three (1) further rapid increase in a data size, (2) higher operation speed of circuits and (3) the additional circuit cost by both size and speed.

Power consumption is a key factor in electronic devices especially for cellular phones power-supplied by batteries. To reduce power consumption, higher operation of circuit is not desirable. Therefore, new unique technologies, but still hopefully inconsistent with the conventional one, shall be requested besides the conventional devising on circuits. The technology based on the principle of data compression is a one of candidate expected to be included in these new technologies. Then, the related arts will be reviewed.

A background art is disclosed in the Japanese Patent Application Laid-Open No. 2003-366107, which illustrates many options as data transmission method for LCD source driver including alternating bit inversion method to reduce data transition, Huffman coding, one-dimensional compression, and arithmetic coding to reduce data size. However, the technologies proposed above cannot always achieve the reduction ratio (that is, compression ratio) better than 1/2 because the attained data size is heavily dependent on data itself. Thus, this technology cannot be used for reducing the count of wirings.

Another background arts are disclosed in the two patents Japanese Patent Application Laid-Open No. 2002-202760 and 2001-166740, which apply a bus inverting technology: the technology reduces a data transition for EMI in transmission (the original data are bit-inverted to reduce transition count when transition count is over the half count of data lines). In these arts, the property of image data is not exploited so that its EMI suppression effect is very low, because that image data are treated as a general data when applying the bus inversion technology.

Another background art is disclosed in the Japanese patent Application Laid-Open No. 2000-152129, which illustrates a technology that executes the addition or subtraction to reduce a count of data transition. In the art, the addition of "1" to data value will reduce a count of transition. For example, consider the case that a data transition from 0000 to 1111 is converted to the data transition from 0001 to 0000. The count is reduced 4 to 1. In the art, the property of image data is not exploited so that its EMI suppression effect is very low, because that data are treated as a general data (not as image data) when applying the addition or subtraction.

Another background art is proposed by the paper by Jun Yang, Rajiv Gupta, "FV Encoding for low-power Data I/O, IEEE, ISLPED 2001", which illustrates a FV coding method that carries out bus inversion by monitoring occurrence frequency of data in a dynamic manner. This method does not also exploit the statistical property of images.

Another background art is disclosed in the Japanese patent Application Laid-Open No. 2003-44017, which illustrates a non-transmission method to reduce the size of data to be transmitted: there is no need to transmit data when data has the same value as that of data found on one horizontal line (1H) before (this data is called as "1H-previous") and the stored 1H-previous data are reused in the receiver (i.e., the source driver). There is averagely about 10% to 20% in actual images for the possibility that data has the same value as 1H-previous. This suggests that the data size can be reduced by 20% at most by this non-transmission. As a result, this method is not powerful enough for the reduction of count of wirings.

Another background arts are disclosed in the Japanese Patent Application Laid-Open No. 2000-20031 and 2003-131627, that illustrate a methods of reducing EMI by using the IH correlation of image. See also the SID IDRC 2003 paper "Vertically Differential EMI Compression Method for High Resolution LCDs" by the same authors Haruhiko Okumura et al. With these methods, a data size and a count of wirings cannot be reduced enough too.

Even when the best is selected in the above conventional technologies that generally believed to achieve an effective compression or EMI suppression with keeping additional hardware modifications small, a count of wirings cannot be efficiently reduced. Then, further investigation will be given on advanced approaches with admitting slightly larger hardware as follows.

The most advanced data compression technology without data loss (lossless) is FCD14495 (ISO standard). It is also known as JPEG-LS (JPEG-lossless). Even with this technology, averagely the compression of 1/2 is achieved to the utmost. It seems apparent at a first glance that a count of wirings could be reduced easily to half. But since a data compression rate greatly fluctuates due to image data itself, in fact, it is quite difficult to reduce a count of wirings to half. As data loss is not allowed, when trying to reduce a count of wirings even the reduction to 1/2 is impossible by considering a worst case of fluctuation on images. Therefore, this technology is not a desirable selection under preset circumstances.

In connection with a data compressing technology, a DPCM (Differential Pulse Coded Modulation) technology is proposed. As a predictor on DPCM technology relating to image data, MED (Median edge detector) and GAP (gradient-adjusted predictor) are widely known. Since the GAP requires a 2H memory and the size of hardware is large, MED will be exploited here thanks to its 1H memory. Then, conventional technologies relating to MED will be investigated as follows.

MED is the technology adopted by JPEG-LS, and it is still under the further development in the recent years. A new modification improves the performance of MED by using diagonal edges in images (see the paper by Jiang et al. "Revisiting the JPEG-LS prediction scheme, IEEE Proc. Visual Image Signal Process, Vol. 147, No. 6, December 2000, pp. 575-580). Further, other modifications of MED improve the performance according to new prediction schemes (see the paper by Grecos et al. "Two Low Cost Algorithms for Improved Diagonal Edge Detection in JPEG-LS, IEEE Transaction on Consumer Electronics, Vol. 47, No. 3, August 2001, pp. 466-473 and Toward improved prediction accuracy in JPEG-LS, SPIE Optical Engineering by Jiang et al., 41(2) 335-341 (February 2002)). Another high-performance MED is also introduced (see the paper by Edirisinghe "Improvements to JPEG-LS via diagonal edge based prediction, Visual Communications and Image Processing 2002, Proceedings of SPIE Vol. 4671 (2002)).

The conventional MED and its variations mentioned above have been used only for the purpose of data compression. On the other hands, they are not used for the purpose of transmitting image data in aiming to low power consumption: that is, the present invention shall exploit MED for the transmission with aiming to low power.

A similar technology is proposed recently in the paper (We-Chung Cheng and Massound Pedram, Chromatic Encoding: a Low Power Encoding Techniques for Digital Visual Interface IEEE DATE 2003, session 6.3), which illustrates a chromatic encoding technology that reduces power consumption using the entropy of an image for DVI (Digital Visual Interface). As this technology premises the transmission interface DVI, it is the modification of TMDS coding so that it is also based on the three premises of DVI: (1) binary data transmission, (2) long length of wiring to transmit data and (3) realization of high-speed operation of data transmitting circuit.

Now following review will be given on the arts to clarify another aspect of the present invention. In general, a multi-valued transmission technology (which transmits data with multi-value) is expected as the image data transmitting technology. In an image data transmitter such as transmission for LCD source driver, there is no transmitting technology that aggressively exploits both multi-valuation and the properties of image correlation. The related arts of multi-valuation will be given as follows.

A background art is disclosed in the U.S. Pat. Publication No. 6,339,622, which illustrates a data transmitting system that realizes multi-valued data transmission in an LCD driver. This system adopts a technology, which converts data into ternary values (3-valued values). However, in this system, a count of wirings is not changed because that the effect for reducing a count of wirings is not obtained by the ternary valuation: ternary values are processed by two bits. In this system, since the properties of images are not aggressively exploited, its performance is poor Meanwhile, a multi-valued logic circuit in an electric current mode is proposed (see Current-Mode CMOS Multiple-Valued Logic Circuits by Wayne Current, IEEE Journal of Solid-State Circuits, Vol. 29, No. 2, February 1994, pp. 95-107). Further, other technologies about multi-valued transmission are proposed (see R. Fajad-Rad, C-K. Ken Yang, M. A. Horowiz and T. H. Lee, A0.3-µm CMOS 8-Gb/s 4-PAM Serial Link Transceiver, IEEE Journal of Solid-State Circuits, Vol. 33, No. 5, May 2000, and S. Srinivasan, Circuit & Signaling Strategies for on-chip interconnects in DSM CMOS, submitted to the Graduate school of the University of Massachusetts Amherst in partial fulfillment of the requirements of the degree of master of science in electrical and computer engineering, August 2002). In these documents, the multi-valuation mainly means 3 (ternary) values and 4 (quaternary) values, and 16 or higher values are hardly used. This comes from the fact that higher level of multi-valuation is not desirable for actual application: as a level of multi-valuation becomes higher and higher, the power consumption increases. This is a serious problem for multi-valued transmission.

The all above technologies are different from the present invention by the inventors, because the present invention is based on both multi-valued transmission and exploitation of the image correlation.

SUMMARY OF THE INVENTION

An image transmitter according to one embodiment of the present invention, comprising:

a color difference differential calculating unit configured to calculate color difference differential data relating to a difference between a current predicting value predicted based on a previous image data and current actual image data;

a coding unit configured to code the color difference differential data to generate coding data;

a multi-valued unit configured to generate multi-valued data based on the coding data and an appeared probability of the coding data based on statistical properties of the image data; and a transmitting unit configured to transmit the multi-valued data via at least one transmission line.

An image receiver according to one embodiment of the present invention, comprising:

a receiving unit configured to receive multi-valued data transmitted via at least one transmission line;

a coding unit configured to restore coding data taking statistical properties of image data into consideration, based on the received multi-valued data;

a decrypting unit configured to decrypt the coding data to generate a color difference differential data relating to a difference between a current predicting value predicted based on a previous image data and current actual image data; and an image restoring unit configured to restore the current actual image data based on the color difference differential signal.

An image transmission system according to one embodiment of the present invention, comprising:

an image transmitter which transmits image data; and an image receiver which receives image data, wherein the image transmitter includes:

a color difference differential calculating unit configured to calculate color difference differential data relating to a difference between a current predicting value predicted based on a previous image data and current actual image data;

a first coding unit configured to code the color difference differential data to generate coding data;

a multi-valued unit configured to generate multi-valued data based on the coding data and an appeared probability of the coding data based on statistical properties of the image data; and a transmitting unit configured to transmit the multi-valued data via at least one transmission line, the image receiver includes:

a receiving unit configured to receive multi-valued data transmitted via at least one transmission line;

a second coding unit configured to restore coding data taking statistical properties of image data into consideration, based on the received multi-valued data;

a decrypting unit configured to decrypt the coding data to generate a color difference differential data relating to a difference between a current predicting value predicted based on a previous image data and current actual image data; and an image restoring unit configured to restore the current actual image data based on the color difference differential signal.

BRIEF DESCRIPTION OF THE DRAWINGS

FIG. 5 is a graph where results of checking the frequency distributions relating to the plural image data are overlapped.

FIGS. 10-13 are diagrams illustrating the distribution of the parameter α.

FIGS. 14 and 15 are diagrams explaining MED prediction.

FIG. 16 is a diagram explaining MED prediction of Edirisinghe.

FIG. 22 illustrates one example of a data flow chart in the image transmitting system in FIG. 19.

FIG. 25 is a diagram illustrating this step.

FIG. 28 is a timing chart of the data transmission of the present embodiment.

FIG. 29 is a timing chart of the data transmission of the multi-valuation map which is improved better than that in FIG. 28.

FIG. 30 is a timing chart of the multi-valued data corresponding to the following multi-valuation map C.

FIG. 31 is a diagram illustrating frequency distribution of the electric current amplitude obtained by normally distributing the parameter of the Laplacian distribution and making the Monte Carlo analysis.

FIG. 33 is a diagram showing an equation expressing an averaging value of electric current amplitude expected finally.

FIG. 34 is a diagram illustrating results of simulation of various images using the multi-valuation map with 16 values shown in FIG. 32.

FIG. 37 is a diagram showing distribution of image set C.
FIG. 38 is a diagram showing distribution of image set D.
FIG. 39 is a diagram showing distribution of image set E.
FIG. 40 is a diagram showing distribution of image set F.
FIG. 41 is a diagram showing distribution of image set G.
FIG. 42 is a diagram showing distribution of image set H.

DETAILED DESCRIPTION OF THE INVENTION

One embodiment of the present invention will be explained below with reference to the drawings. The statistical fact utilized by the present invention will be firstly explained, and then one embodiment of the present invention will be explained based on the fact. The present invention can be applied in various electronic devices such as a TV, a PC monitor, a cellular phone and a digital camera, which transmit image data.

In general, image data has a correlation in a horizontal (H) direction and a vertical (V) direction. This is called as 1H (1V) correlation. This is a statistical property: the two data of current pixel and its adjacent one statistically have the similar values where adjacent pixel is located on 1 horizontal line (hereinafter, 1H) before or 1 vertical line (hereinafter, 1V)

before. Let's call such adjacent pixel as "1H-prevous" and "1V-previous" respectively hereinafter.

Single pixel of image data has three values relating to RGB. Hereinafter, red (R) data will be discussed to explain our technology for the sake of simplicity. Let an expression R(1H) denote a 1-H previous value for R data, and let an expression R(0) denote a current value for R data. It is experientially known that a value of differential data R(1H)–R(0) (1H differential data) distributes according to a Laplacian distribution curve with 0 being a center when sufficiently many data are supplied to analyze. This is the 1H correlation.

In the Laplacian distribution, occurrence frequency (i.e., probability) becomes abruptly (exponentially) small as moving to far points from the center. Meanwhile, a probability at the center is very high: this extremely high probability means that 1H-previous value and current value are equal to each other in almost cases. The Laplacian distribution is a statistical tendency of image data, so its probability does not accurately match with Laplacian distribution curves themselves for individual set of images. In this way, the distribution should be understood as a probability, which will be statistically converged.

Actually, as a size of image data increases, a curve of an analyzed result has smoother distribution. FIGS. 1 to 4 are diagrams illustrating analyzed results of various image data: a frequency distribution in respective gradation indices of the image data, a frequency distribution of 1H difference, and a logarithms of frequency distribution of 1H difference. Remember again that 1H difference means a difference between the two pixel values: a current value and a 1H-previous value. The term "frequency" means a count of an occurred event, that is, a count of pixels having a same gradation index.

Figure 1:
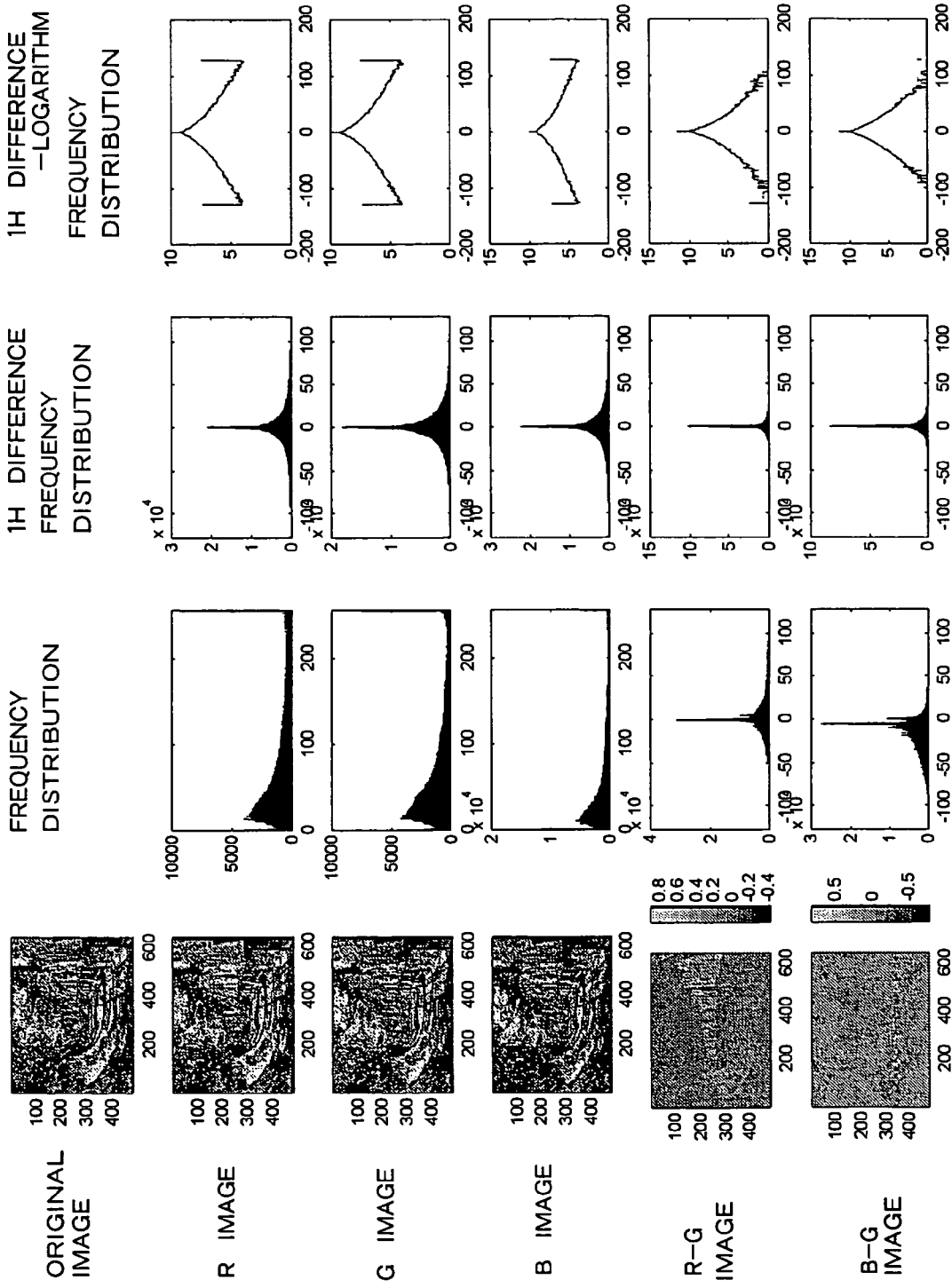
FIG. 1 is a diagram showing an analyzed result of a certain image data.

For example, in FIG. 1, an original image to be analyzed is shown on the upper left-most portion. RGB data of this image are extracted, and R image, G image and B image are shown as monochrome gradation data. These three images are arranged below the original image successively. R–G image and B–G image are obtained by calculating values of R–G and B–G respectively as two color-difference signals, and these two images are shown as monochrome gradation data arranged below further. There are graphs arranged in both vertical and horizontal directions, and each of which shows the frequency distribution of the data values of respective images. The graphs on the first column give the frequency distribution of the R, G, B, R–G and B–G images from up to down. In these distribution graphs, x-axis represents an index of gradations with 256 gradations (0 corresponds to black and 255 corresponds to white), and a y-axis represents a frequency (occurrence count) of the pixels having a same gradation index.

In a case of the 1H-color differences R–G and B–G, graphs (differential data) are given on a second column. In these graphs, these differential data are within a range of the gradation index –255 to 255.

For example, on the R image of FIG. 1, a peak is found near the gradation index 30, and the frequency value gradually decreases for higher gradation indices. The G image and the B image have the distribution curve approximately similar to that of the R image. The frequency distribution of the images cannot be expressed by a pre-determined fixed curve because the distribution heavily changes according to images themselves.

Figure 2:
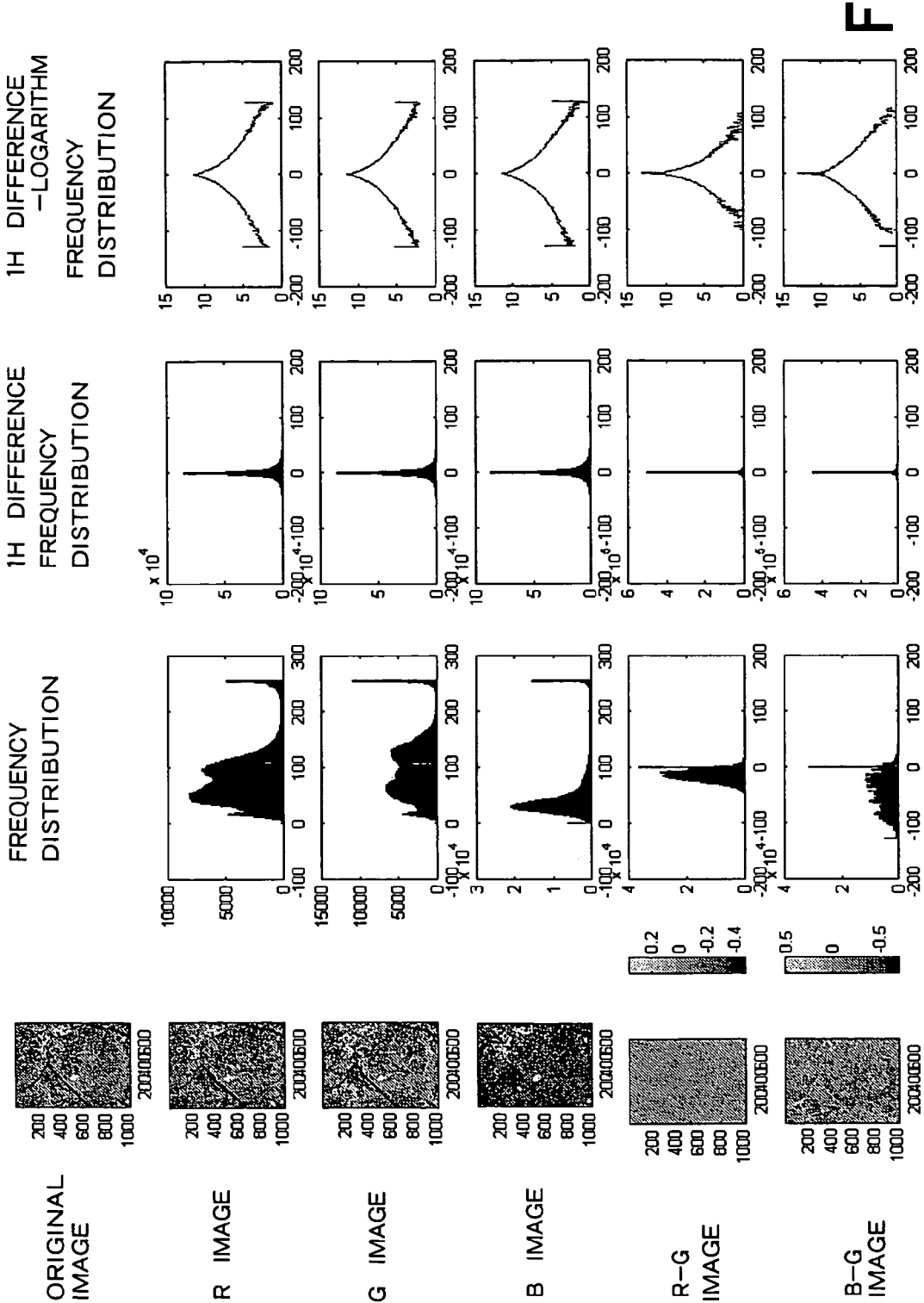
FIG. 2 is a diagram showing an analyzed result of a certain image data.
Figure 3:
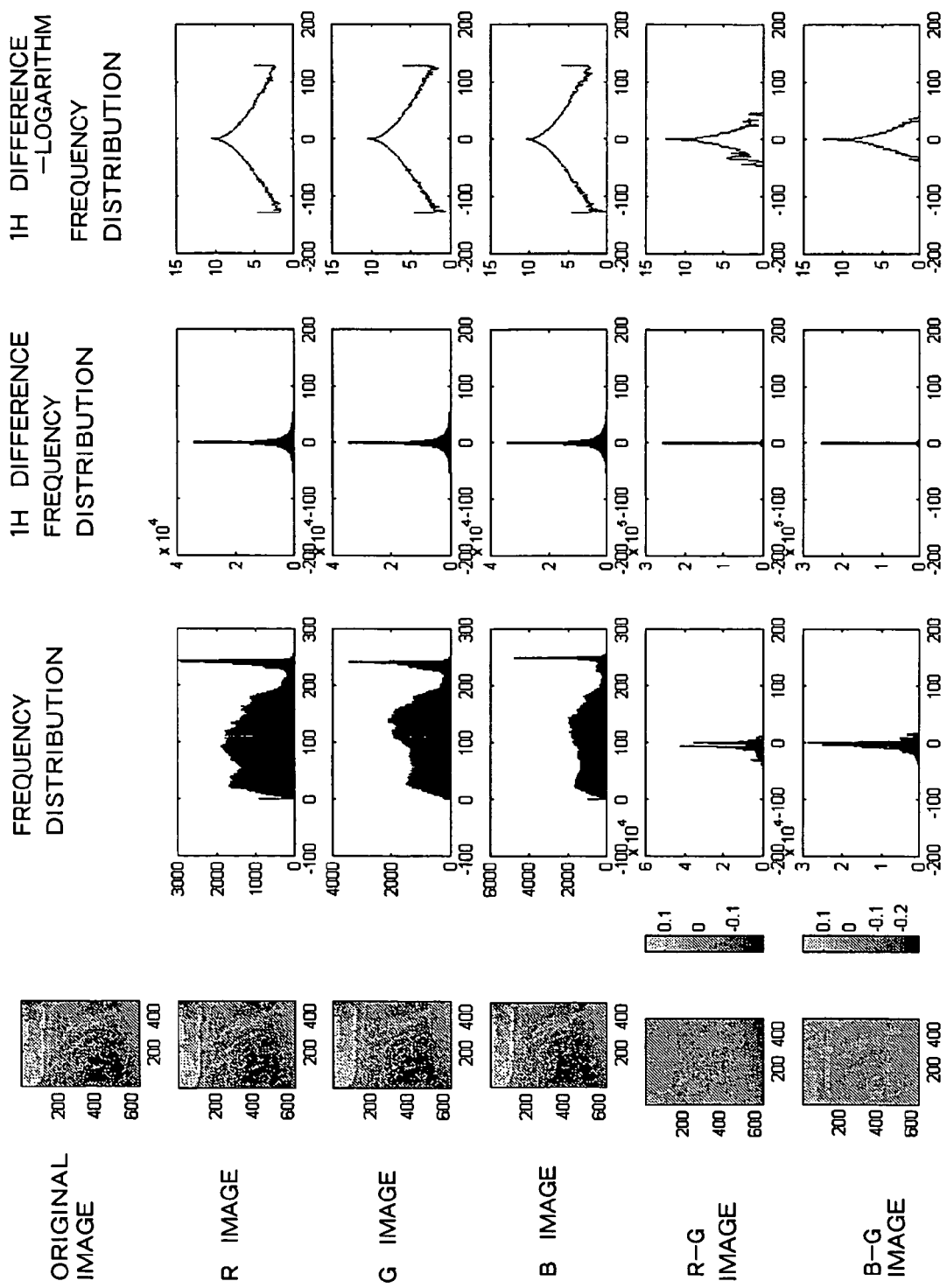
FIG. 3 is a diagram showing an analyzed result of a certain image data.
Figure 4:
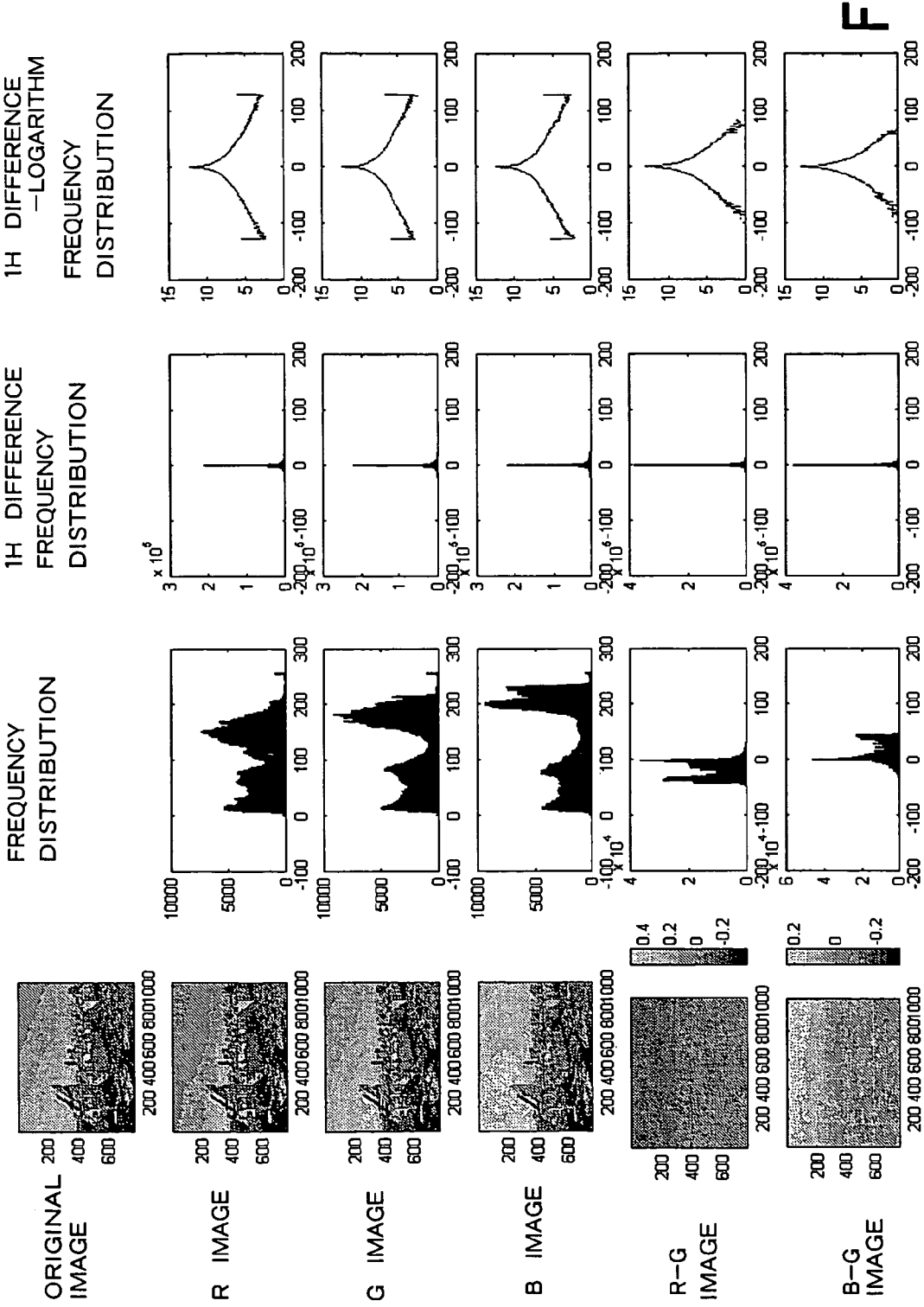
FIG. 4 is a diagram showing an analyzed result of a certain image data.

When comparing the examples of FIGS. 2, 3 and 4, the R, G and B distributions have respectively unique shapes, and do not have an identical shape to any of them. Further, the R–G image and the B–G image mostly have a shape such that the distribution is concentrated on 0, but the distributions are not symmetrical in most cases. They are not characterized in the form of the Laplacian distributions in general.

The graphs on the second column illustrate the frequency distribution of 1H differential data. In FIGS. 1 to 4, the distributions are concentrated on 0, and can be closely approximated to the Laplacian distribution. In order to check the shapes of these distributions in better way, the logarithm value of the frequency is given in the graphs on the third column. In the third column, the shape of the distributions is sharply peaked too at the center, and the inclination becomes gradually gentle compared to the second column. The value abruptly increases at the edges of the graphs because the frequencies are summed up in the analyzing section between –127 and 127 and all the frequencies outside the analyzing section are accumulated as abrupt increase. Since these values of abrupt increase are not essential data caused by maloperation of the analyses, they should be ignored.

FIGS. 1 to 4 confirm that the individual image data have the distribution characterized by the Laplacian distribution. Now the statistical macro model of distribution shall be defined in order to treat the statistical ensemble of images. In general, image data to be transmitted is not known beforehand. According to the statistical macro model based on results of analyzing a plurality of images, parameters of the Laplacian distribution will be determined.

In the graph given by FIG. 5, there are overlapped results of analyzing the frequency distributions (Laplacian distribution) for the plural image data. The axis of abscissas in FIG. 5 represents the gradation index, and the axis of ordinate represents the frequency at respective gradation index. Respective curves in FIG. 5 are closely approximated to the Laplacian distribution, but the inclinations are different according to individual image data. Each Laplacian distribution is statistically distributed around center: curves are distributed more densely around center curve.

Figure 6:
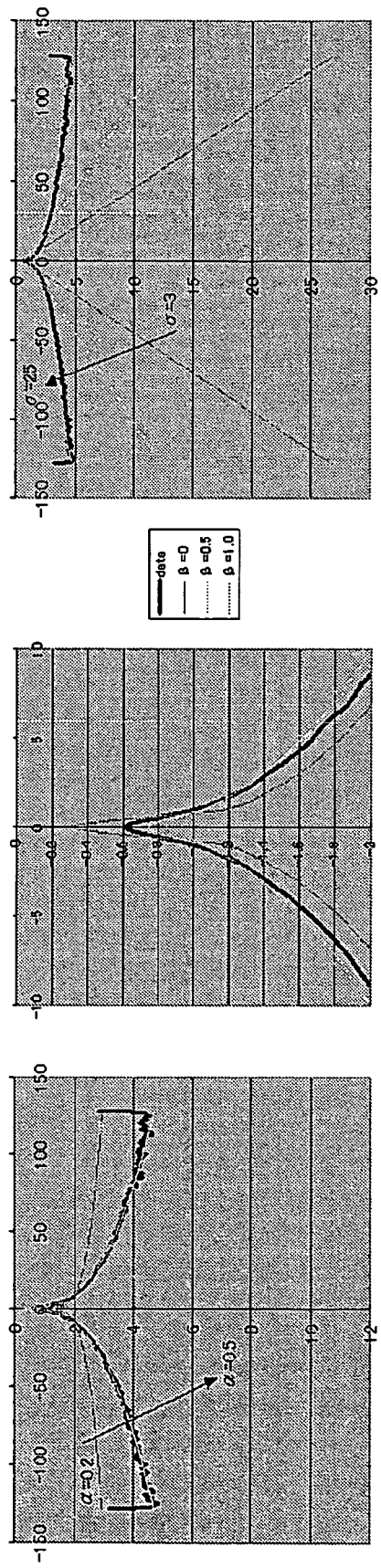
FIG. 6 is a diagram explaining the statistical model used in this embodiment.

FIG. 6 is a diagram explaining the statistical model used in this embodiment. Though the above paragraph explains that an image data can be closely approximated to the Laplacian distribution, but its distributions are slightly different for actual instances of application. In the case of the Laplacian distribution, the value decreases linearly on the graph of logarithm frequency. Such linear approximation is considered satisfactory as a first approximation: in order to treat the fact such that inclination becomes gradually gentle, $\alpha$ as a parameter of power is used for gradation index $\epsilon$ (gradation index of 1H difference). In order to precisely express sharpness of the distribution curve on the center portion, a parameter $\beta$ is introduced. A parameter $\sigma$ is already included in the original Laplacian distribution. A parameter $\kappa$ is a coefficient introduced for normalizing the probability to 1, and it is also included in the original Laplacian distribution.

Distribution obtained by extending the Laplacian distribution (extended Laplacian distribution: hereinafter, "extend" is not used explicitly for simplification, it is occasionally called also as the Laplacian distribution) will be treated hereafter.

Let $p(\epsilon)$ denote a probability of the extended Laplacian distribution when given the gradation index $\epsilon$ (accurately it should be called as "differential gradation" but it is called simply as "gradation" hereafter). When being strongly aware of the Laplacian distribution, the parameters $\alpha$, $\beta$ and a as well as $\epsilon$ are added explicitly as arguments, then its description is shown like p ($\epsilon$, $\alpha$=0.4, $\beta$, $\sigma$). The arguments are identified by the names of its parameters. The parameter $\beta$ is close to 0 in value in most cases. Then, the statistical macro model will be formulated in detail by considering the further advanced statistical distribution with the parameters $\alpha$, $\beta$ and $\sigma$.

In this embodiment, when α, β and σ relating to a gradation index ε are distribution parameters and κ is a normalizing parameter, the following probability distribution p(ε) is defined as the extended Laplacian distribution. The extended Laplacian distribution is expressed by the formula (1), where ^ is a postfix notation of power function.

$$p(\epsilon) = k * \exp(-\sqrt{2}(|\epsilon|^{\wedge}\alpha + \beta)/\sigma) \quad (1)$$

A 1H difference can be treated with not only R, G and B images but also color-difference signals of R–G and B–G. Actually, this differential data have higher correlation. Assume that respective 1H differences are denoted by Δ(R), Δ(G) and Δ(B) of R, G and B: for example, Δ(R)=(current R value)−(1H previous R value). Then, a 1H difference of a color difference signal R–G is given by the following: Δ(R–G)=(current R–G value)−(1H-previous R–G value)=(current R value)−(current G value)−(1H-previous R value)+(1H-previous G value)=(current R value)−(1H-previous R value)−(current G value)+(1H-previous G value)=ΔR−ΔG. Similarly, Δ(B–G)=ΔB−ΔG.

Figure 7:
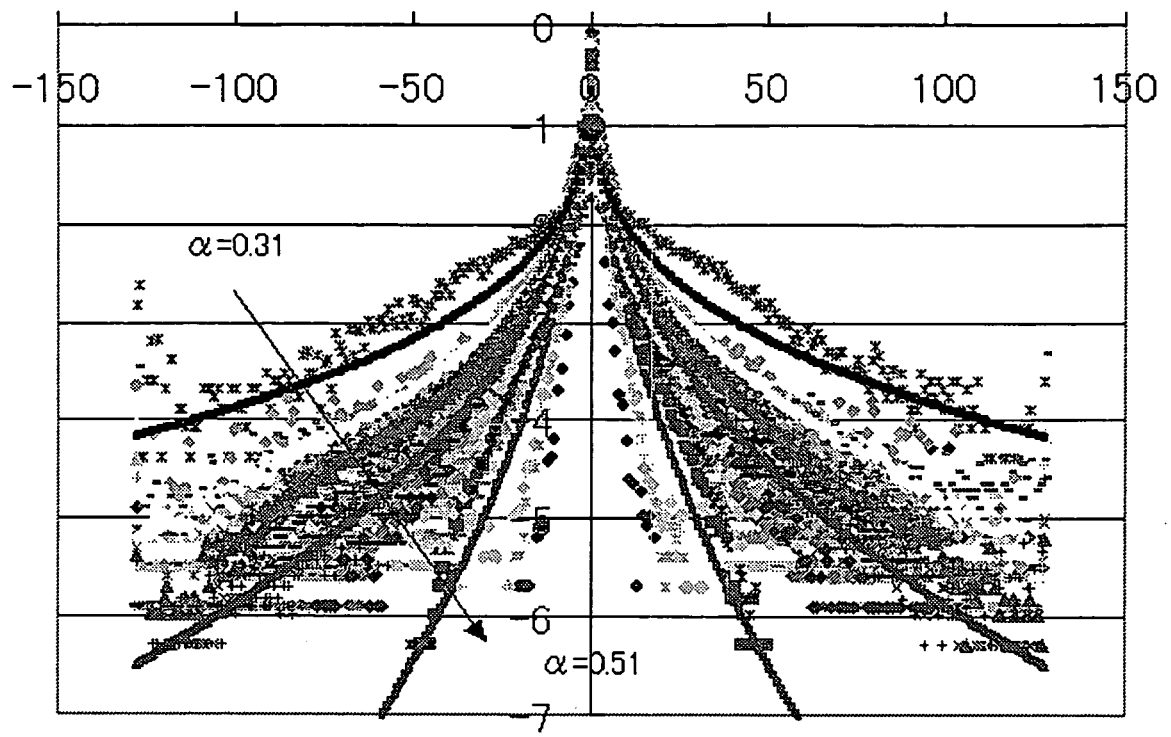
FIG. 7 is a diagram illustrating results of analyzing the distribution in 1H difference of the color-difference signal relating to various image data.

FIG. 7 is a diagram that illustrates results of analyzing the distribution about 1H difference of the color-difference signal relating to various image data. In FIG. 7, the value of the parameter α, which shows the inclination of the extended Laplacian distribution, is within the range from 0.31±3*0.05 to 0.4±3*0.07 (range is given as the expression: average ±3σ). This suggests that the average value is higher by approximately 0.1 compared with the analysis by the non-extended distribution model, namely, that the curve drops more sharply. This also implies that correlation becomes high, thereby it improves the reducing capability to be exploited.

Figure 8:
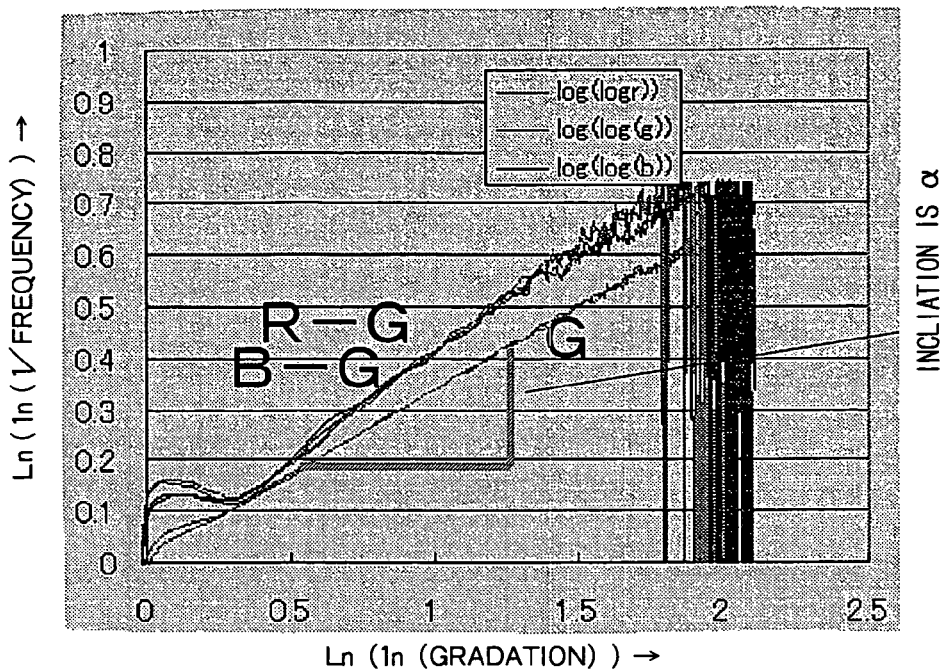
FIG. 8 is a diagram illustrating a method of obtaining the parameter α.

FIG. 8 is a diagram illustrating a method of obtaining the parameter α. A x-axis in FIG. 8 represents a natural logarithm of the natural logarithm (logarithm is doubly taken) of a gradation index ε in a 1H differential data, namely, ln (ln(ε)). Hereinafter, the natural logarithm is occasionally abbreviated to logarithm for the sake of simplicity. A y-axis represents a logarithm of the logarithm of an inverse number of pixel count of gradation index ε (accurately speaking, a probability represents a frequency (count) of pixels found in an image). And, ln (ln(1/frequency)) has an offset with a certain constant value as y-intercept. Since a probability is represented by a result of normalizing to 1, value itself is not a count of pixels.

As expressed by the formula (1) in the extended Laplacian distribution, since the formula is expressed using the αth power of |ε|, a logarithm is taken twice to obtain the value of inclination parameter α using the linear graph. The Laplacian distribution is symmetrical with respect to x axis, and since an αth power of an absolute value |ε| of ε is calculated, two straight lines are formed corresponding to right and left two areas (where the term "right" means the right side in the distribution graph, that is, ε is positive, and the term "left" means that ε is negative). So there are two values of α parameters according to two symmetrical shapes given by right and left. As actually two shapes are symmetrical in so good manner, they can be treated as a single value.

FIG. 8 includes the analyses for G, R–G and B–G. It is fortunate in many cases that any one of them may be analyzed as a representative of RGB, since curves of the RGB data are approximately same each another. As to color-difference signals, there is also the same fortune that R–G and B–G have same curves. According to this drawing, actually the G data has the approximately straight line. The curves of R–G and B–G have the bound around the gradation indices ε having small values. Meanwhile, for rest of almost data where ln(ln (ε)) has a large value, they forms the straight lines. It is also observed that the right ends of the data do not approximated by straight lines, and the values fluctuate greatly depending on individual images data. This problematic phenomenon occurs more often when the size of image is small. The phenomenon is explained by the statistical loss of pixels: there are expected losses to be found in an image having a not large enough count of pixels for statistical convergence. Since this problematic phenomenon is negligible in obtaining the inclination parameter α, the values of α will be obtained and utilized in the following.

Figure 9:
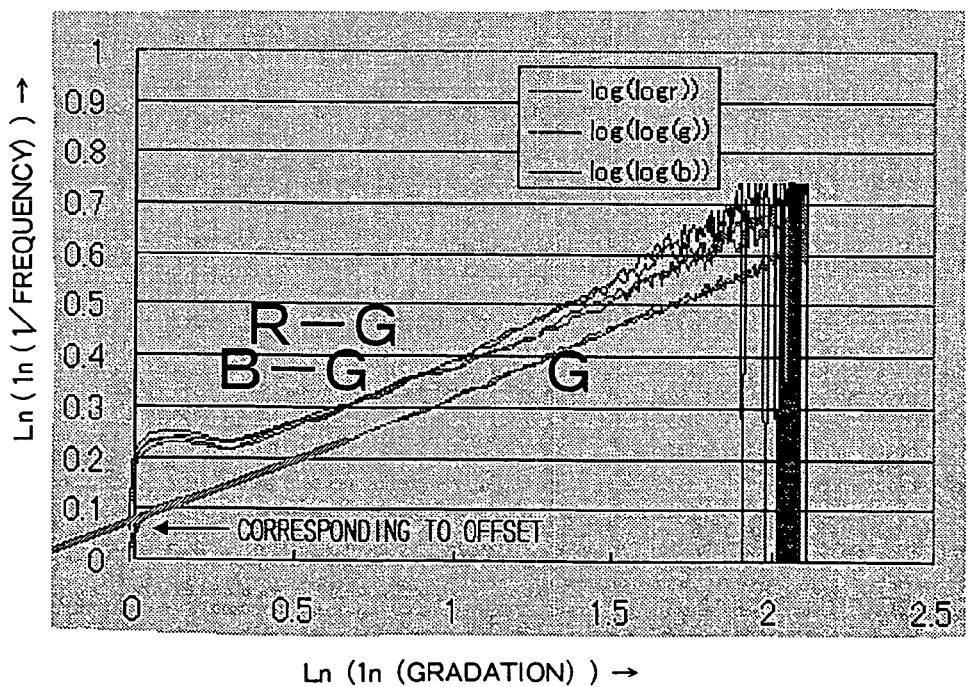
FIG. 9 is a diagram illustrating a method of obtaining the parameter β.

FIG. 9 is a diagram illustrating a method of obtaining the parameter β. The parameter β is obtained as the value of ln(ln(1/frequency)) of the G data where ln(ln(gradation))=0.

Figure 10:
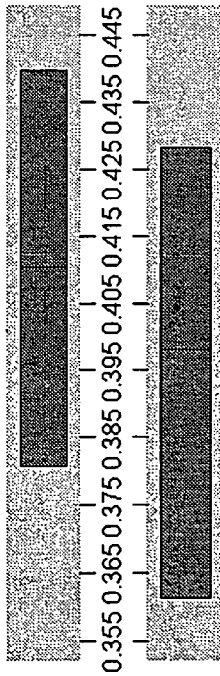
Figure 11:
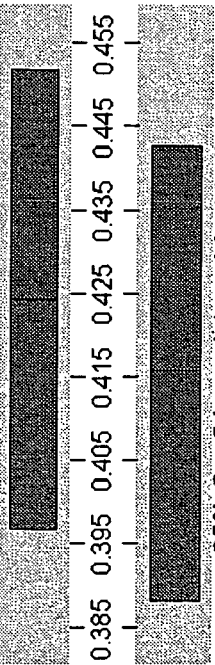
Figure 13:
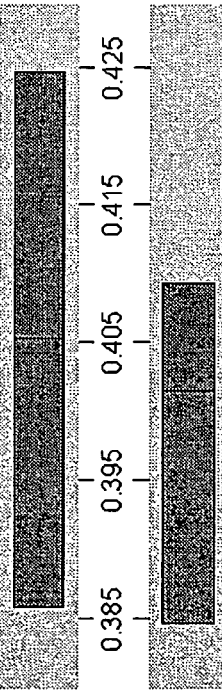

FIGS. 10 to 13 are diagrams illustrating the distribution of the parameter α. These drawings respectively include α values obtained by FIG. 8 for 36 sample images. There are four cases according to the combination of the analyzing method and the data objects to be analyzed. The analyzing method has the two choices: the passing of the origin point is forced or not in the regression analysis to obtain the value of inclination, that is, the parameter β is treated or not. The data object has the two choices: right or left curves. Each case is shown in FIGS. 10 to 13. FIGS. 10 and 11 illustrate the distribution of the parameter α when the parameter β is treated. FIGS. 12 and 13 illustrate the distribution of the parameter α when the parameter β is not treated. FIGS. 10 and 12 illustrate the distribution of the parameter α when analyzing with the data of right (positive) area in FIG. 4. FIGS. 11 and 13 illustrate the distribution of the parameter α when analyzing with the data of the left (negative) area in FIG. 4.

These figures give the following observations. Reflecting the fact that the β is small (0.01±3*0.1, and actually it is 0.0), any analysis has a similar final result. There are four final results: 0.410±3*0.087, 0.424±3*0.081, 0.40±3*0.060, and 0.405±3*0.057 where the result of the color-difference signal R–G (B–G) is represented by (average μ)±3*(standard deviation σ). To summarize these results, set α roughly to be 0.4±0.2 hereinafter.

The value α=0.31±0.1 is given by the similar analyses on R, G and B. The 36 samples are natural images, and they are considered to faithfully reflect the distribution of general images of TV or the like. In general, there is a high 1-H correlation for images such as: pictures created by using drawing software and animation images painted by using the pallet with few color. On the contrary, there is a low correlation for natural images such as landscapes.

Analyses will use television or video images as the worse input cases based on the above experiential fact. Images of landscapes (including both close view and distant view) and cartoon drawings where objects are not filled with single color are analyzed. It is generally said that the image of close view has low correlation. But a distance is not always a primary factor of correlation. Anyway, correlation is measured in a relative matter.

The above discussion gives the doubly statistical concept in order to treat the statistical distribution of images as ensemble: there is the distribution (normal distribution) of the parameters where the parameters express the distribution (Laplacian distribution) of single image. This doubly statistical distribution is called as "a statistical macro model" here. In the statistical macro model (extended Laplacian distribution), hereinafter, probability distribution in which the distribution parameters α, β and σ are normally distributed is called as "a statistical macro model of the extended Laplacian distribution".

The statistical macro model is defined by the above discussion. A technique to reduce a count of wirings will be explained below for transmitting a differential data of images.

The concept of the technical idea in the present invention is the reduction of wire counts and the reduction of power consumption by using multi-valued transmission and by exploiting the deviation of occurrence probability (frequency) of gradation index of image. In the conventional techniques, this statistical deviation was exploited for data compression or EMI reduction. The present invention is characterized in the way that the statistical deviation is exploited for the multi-valued transmission of image data in order to reduce both wire count and power consumption.

The 1H difference technology will be reconsidered from the viewpoint of DPCM technology as follows. A current value of a 1H difference is predicted by a 1H-previous value. A difference between a predicted value and a current value is transmitted. A value of the difference becomes smaller when prediction gives better prediction accuracy, that is, higher correlation. By using this result given by a predictor, electric current amplitude will be reduced.

The MED technique improves predicting accuracy by using not only 1H-previous pixel but also a plurality of additional neighbor (adjacent) pixels around the current pixel to be currently processed). The MED technique makes a prediction using already received data, but not using the data to be transmitted in the future. Such a prediction is called as "causal prediction".

The MED technique to be used in the present invention is also the causal prediction. When looking the distribution result by the calculation of a difference (MED difference) between a MED-predicted value and an actual value, a MED distribution has a very higher correlation than that of 1H difference. The distribution is steeper than that of the conventional 1H Laplacian distribution. This means that the statistical distribution is improved (predicting accuracy is improved). Such an MED difference is transmitted. On the receiving side, the same MED predictor is replicated so as to calculate another predicted value, and this predicted value is added to the transmitted difference, so that original data can be restored. The MED technique can be recognized as one example of DPCM that include the following processing: it transmits the difference, adds the predicted value to the difference and restores original data. Needless to say, 1H difference is also the simplest example of DPCM.

A technique, which transmits MED differential data of such an image to finally reduce a count of wirings, will be explained below. The concept of the technical idea of the present invention is to conduct multi-valued processing to reduce electric current amplitude and reduce the count of wirings, by using deviation of occurrence probability (frequency) of image data. In the conventional technologies, the statistical deviation is exploited for the data compression or the EMI reduction. In the present invention, this MED technique is combined with the multi-valuation technology of the image data transmission, so that the statistical property is firstly applied to the reduction in the count of the wirings and the reduction in the electric current amplitude. In order to emphasize this, this is described again explicitly.

With reference to FIGS. 14 and 15, the MED predictor will be explained below. Let x denote the current pixel with having color information which is calculated from RGB images in more general way (not specified as their explicit calculations). The value of x is predicted by using information of adjacent pixels a, b and c. The pixels and their values are intentionally confused to use for the sake of simplicity: the color information "a", namely, the value of gradation index of the pixel "a" is called as "a" at the same time. This intentional misuse will be used hereinafter.

In general, it is known that a correlation in the vertical direction is slightly higher than in the horizontal direction. Since a prediction should be causal, information about pixels before a current pixel x is not available to calculate. Regarding the hardware realization, a line memory for data is necessary in order to save the pixel data located upper in the vertical direction. In order to reduce a memory size as small as possible, a 1H-memory is preferable to store.

The pixels a, b and c around x are used in order that their correlation can be expected to be higher as follows. When image includes an edge, the prediction of the value x has difficulty which will be resolved later. Otherwise, in the case where a change in the value is gentle, namely, flat, the value x can be predicted as an average value: x=a+b−c.

The average value does not give successful prediction when the value abruptly changes (that is, an edge is found). To resolve this problem, the MED improve the prediction accuracy by the edge detection that checks the type of the edge (vertical or horizontal).

For example, assume a situation that the values cb (c and b) are high and the values ax (a and x) are low, namely, the situation that the vertical edge is found between cb and ax, where cb and ax are partial lines to be expected as constituted line. The algorithm of the MED technique will be explained. In this situation, the value of "a" should be adopted in order to predict x. In this situation, assume c>b additionally. Then, x is predicted by min(a,b)=a that is derived by the c≧max(a,b). Next, assume another situation that the value ca is high and the value bx is low, namely, the situation that the horizontal edge is found between ca and bx. In this second situation, assume c>a additionally. Then, x is predicted by min(a,b)=b that is derived by the c≧max(a,b). By enumerating the situations about pixel values in such ways, the algorithm of MED is constructed.

The problem of the above MED is the poor capability of prediction (poor accuracy of prediction) when a diagonal edge is found. Edirisinghe MED overcomes this difficulty. In his case, d is included additionally as one of adjacent pixel value for prediction, so that the diagonal edge is treated.

The prediction x=b+d−a located in the third line in FIG. 16 is the prediction that treats the diagonal direction. The decision c−max(a,b)>T1 detects an edge based on the modification of the decision c≧max(a,b). The prediction is controlled by using a threshold T1. The decision abs(a−b)≦T2 checks whether the values a and b are close to each other or not, where "abs" is a function to give an absolute value, and T2 is a threshold for decision. If values a and b are close to each other, namely, abs(a−b) is small, an edge can be expected to be found in the diagonal direction. If a difference between a and b is large, it is highly possible that an edge will be found in the vertical or horizontal direction. In such a manner, the prediction on the diagonal edge is performed by the x=b+d−a.

The other cases will be treated in the same way above. Such prediction is devised to detect a global edge using a local situation, and thus no theory ensures the prediction works well for all cases. The prediction accuracy is just improved in the statistical meaning: it is a good thing to get the sharper statistical distribution of a difference between a predicted value and an actual value.

Figure 17:
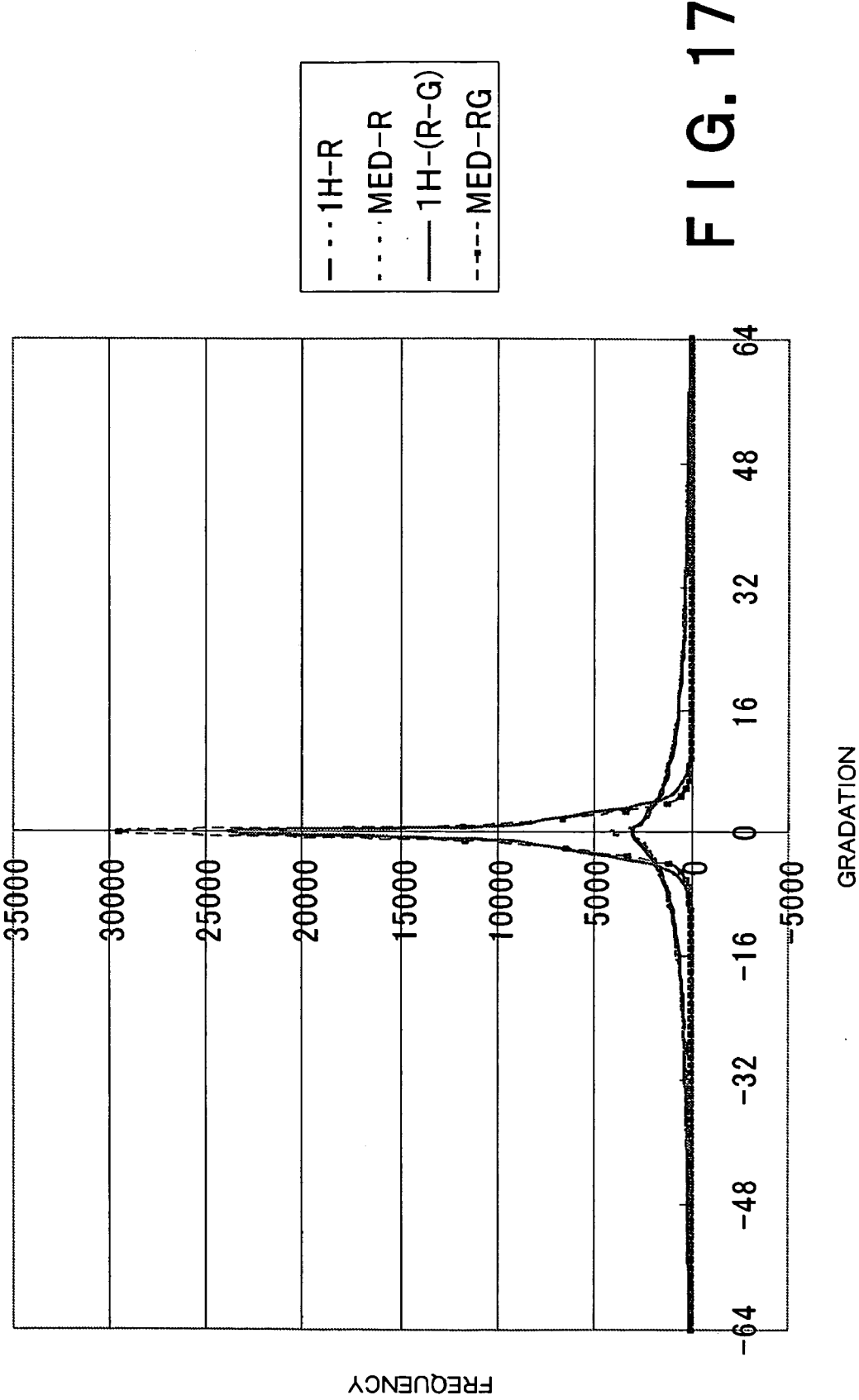
FIG. 17 is a diagram showing a modified example of differential data by MED.
Figure 18:
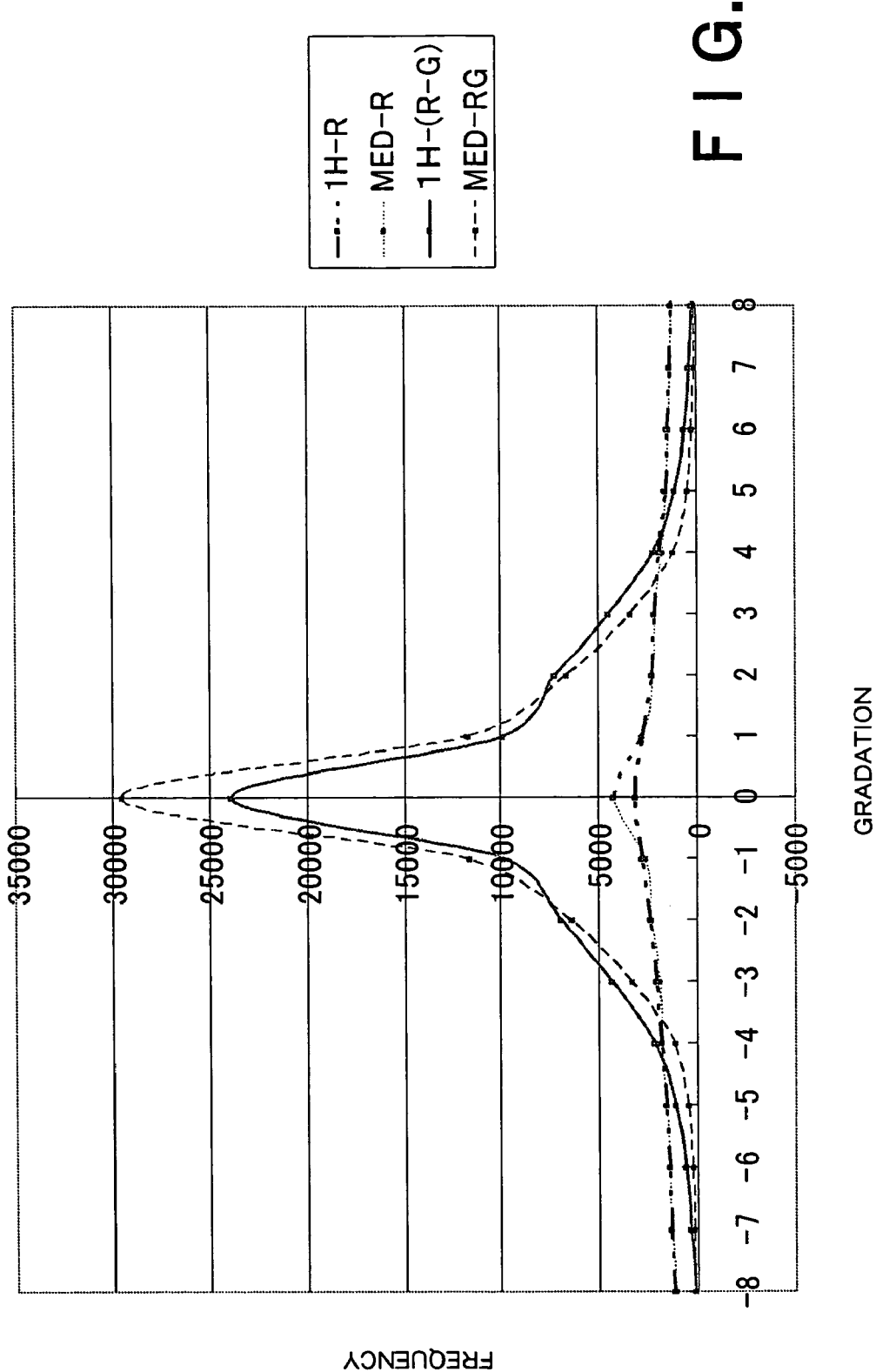
FIG. 18 is a diagram in which a center portion (around 0) of FIG. 17 is further enlarged.

An example is shown in FIGS. 17 and 18 where the distribution of the differential data is improved by using such MED. FIG. 18 is a diagram where a center portion (around 0) of FIG. 17 is magnified further. The occurrence frequency of differential data of the center (0) increases in comparison with 1H. It suggests that the characteristics are improved. In the present invention, this improvement will be exploited in the multi-valuation. MED by Edirisinghe is one of the most excellent prediction techniques at the present. However, prediction technique to be used in the present invention is not limited to this Edirisinghe MED. If another predictor is proposed in future, it goes without saying that the predictor can further improve the present invention.

Figure 19:
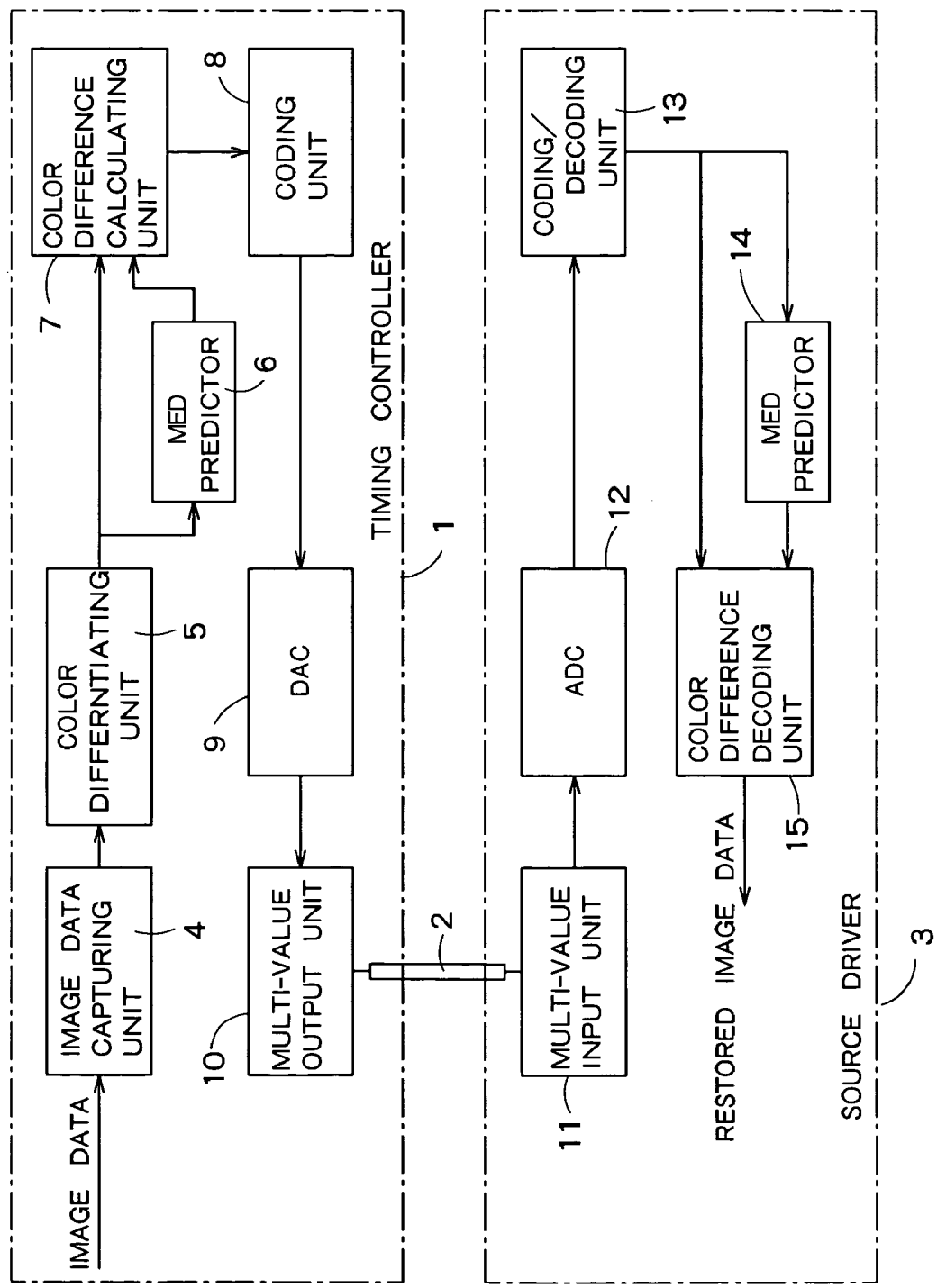
FIG. 19 is a block diagram illustrating a schematic constitution of an image transmitting system according to one embodiment of the present invention.

FIG. 19 is a block diagram illustrating a schematic of an image transmitting system according to one embodiment of the present invention. The image transmitting system in FIG. 19 has a timing controller 1 which converts RGB image data into multi-valued data to output them, and a source driver 3 that receives the multi-valued data transmitted from the timing controller 1 via a wiring 2 to restore the original image data. The timing controller 1 and the source driver 3 actually can be incorporated into various electric devices. For example, the timing controller 1 is incorporated into a host computer, and the source driver 3 is incorporated into a display device.

The timing controller 1 has an image data capturing unit 4, a color differentiating unit 5, an MED predictor 6, a color difference calculating unit 7, a coding unit 8, a D/A converter (DAC) 9, and a multi-value output unit 10.

The source driver 3 has a multi-value input unit 11, an A/D converter (ADC) 12, a code restoring unit 13, an MED predictor 14, a color difference restoring unit 15 and an image data output unit 16.

The color-differentiating unit 5 generates color difference data of G, R–G and B–G for each pixel based on the RGB image data. The MED predictor 6 calculates the predicted value by using the color difference data. The color difference calculating unit 7 calculates color difference differential data between the color difference data and the predicted value by using an adder not shown. The differential data are called as MED color difference-differential data.

The multi-valuation by the coding unit 8 encodes the MED color difference-differential data into physical data (electric current amplitude or voltage amplitude). This multi-valuation improves the data transmission speed. Conventionally the binary data (0 and 1) are transmitted, but in this embodiment, for example, the data are 4-valued, 8-valued, 16-valued, 32-valued, 64-valued or the like. As the level of valuation is getting to higher and higher, the data rate increases higher, and thus the count of the wirings 2 can be further reduced. For example, in the case where 2-valued (binary) data are transmitted using twelve wirings, 4-valued (quaternary) data are transmitted using six wirings, 8-valued data are transmitted using 4 wirings, 16-valued data are transmitted using three wirings, and 64-valued data are transmitting using two wirings. Such multi-valued data are transmitted from the LCD timing controller, for example, via the wirings 2 to the LCD source driver 3.

In general, this transmission can be utilized when images are transmitted, and it is not limited to the data transmission to the LCD source driver 3. It is implicitly assumed that data are not transmitted at high speed but rather at low speed as possible. And also assume that wirings 2 can be treated as the sufficient short wirings. That is to say, the extension of the TMDS coding is not considered.

The source driver 3 will decode (the term "decode" is used interchangeably for "restore" here) the received data and finally restore the image by executing the inverse process successively in the inverse order that the timing controller 1 executes encoding images. That is to say, multi-valued data are decoded into MED color difference-differential data to be fed to MED. Then the decoded data are added to the predicted value obtained by the MED predictor 6, to decode the color difference signal. G is added to the decode color difference signal, so that RGB data are finally restored. A conventional driver circuit is available to drive liquid crystal by inputting these restored RGB data. The detail of the schematic signal flow will be further explained.

Figure 20:
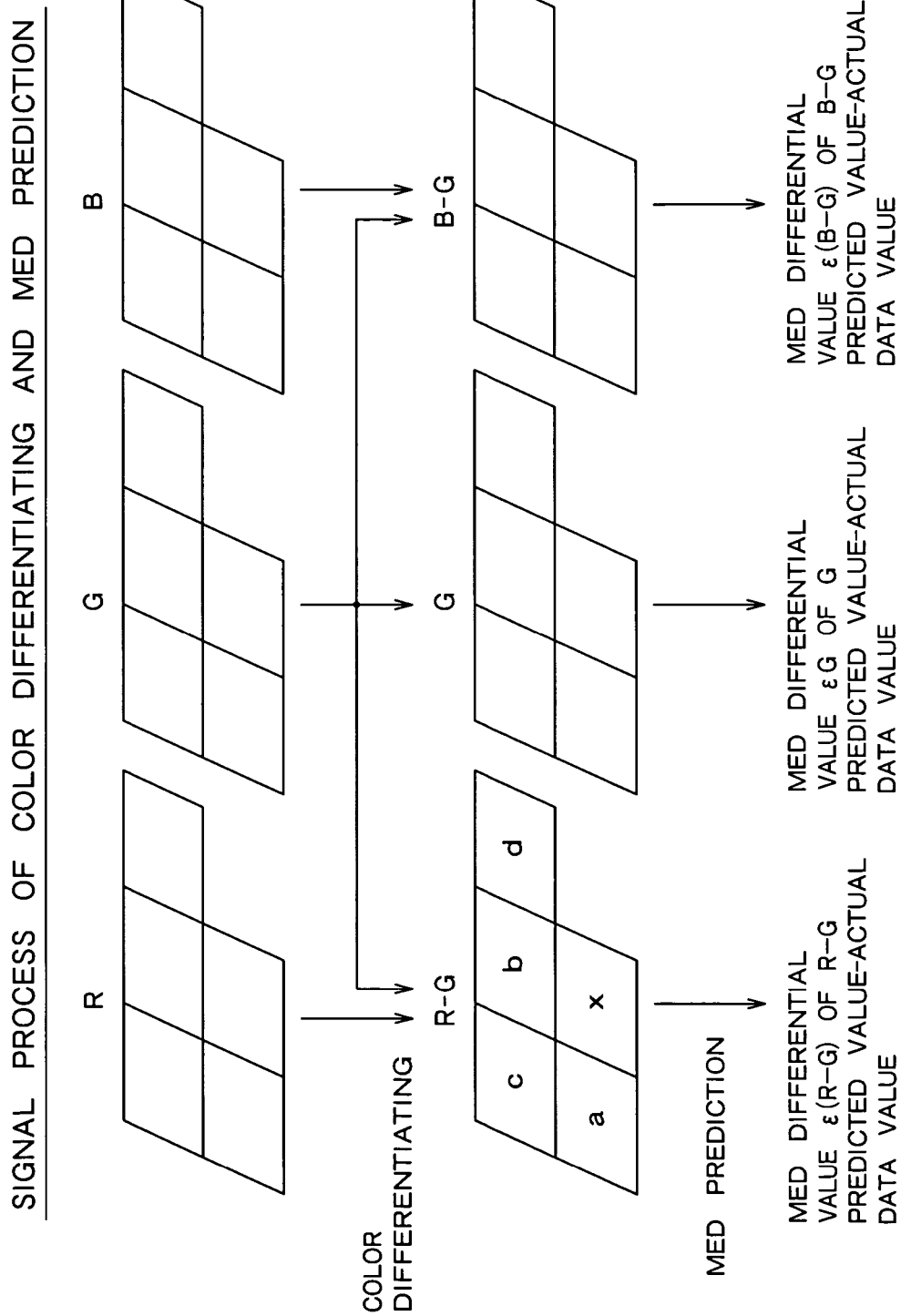
FIG. 20 is a diagram explaining processing contents of the color differentiating unit 5 and the MED predictor 6.

FIG. 20 is a diagram explaining processing details of the color differentiating unit 5 and the MED predictor 6. The color differentiating unit 5 calculates R–G and B–G for the pixel x, to obtain color difference data of R–G, G and B–G. G is not a color difference in essence, but G is also included in "color difference data" for the sake of simple treatment. The color differentiating unit 5 calculates R–G, G and B–G for the respective pixels a, b, c, d and x.

The MED predictor 6 calculates MED-prediction value of R–G data. Let $\epsilon$(R–G) denote a MED differential data. Similarly, the MED predictor 6 calculates $\epsilon$G and $\epsilon$(B–G). A multi-valued map will be defined later for these three $\epsilon$ data.

Regarding the color differentiating, there are many options to use: color difference coding for the combinations of B, R–G and B—G or R, R–G and B–R as well as the color differentiating of G, R–G and B–G may be used. For example, the inventors confirmed that B shows higher correlation than that of G for an underwater photograph. In this case, B, R–G and B–G should be desirably selected.

There are other options: Y, R–Y and B–Y using a luminance signal Y may be used. In general, various formats such as YUV and YIQ can be used as color differential signal as well.

In recent years, since cells of red-cyan, green-magenta and blue-yellow as well as a cell of red-green are found as the double opponent cell in V1 (primary visual area) of brain, another color difference axis can be selected. For example, 2R–(G+B)=(R–G)+(R–B) as red-cyan, 2G–R–B=(G–R)+(G–B) as green-magenta, and 2B–R–G=(B–R)+(B–G) as blue-yellow may be added to conventional color differences. Actually, the inventors confirmed that the above color difference signals (such as red-cyan, green-magenta, blue-yellow) show the Laplacian distribution.

In the case of the color differences such as R–G–B, G–R–B and B–R–G, since their shape of the distributions mostly is gentler than the conventional ones, the addition of the expression of 2R–(G+B) has been only explained in the above. However, there are many cases where the distribution is not gentle just like as the underwater photograph. For this reason, the expression of the R–(G+B) should be also included. From the viewpoint that a neutral color is used, it is occasionally desirable that data are treated with an axis of the neutral color as a primary axis. This is also one of the candidates. Since the conversion from RGB can be realized by simple hardware, the combination of G, R–G and B–G is adopted (but not limited to this). Below will be explained by using this combination.

Figure 21:
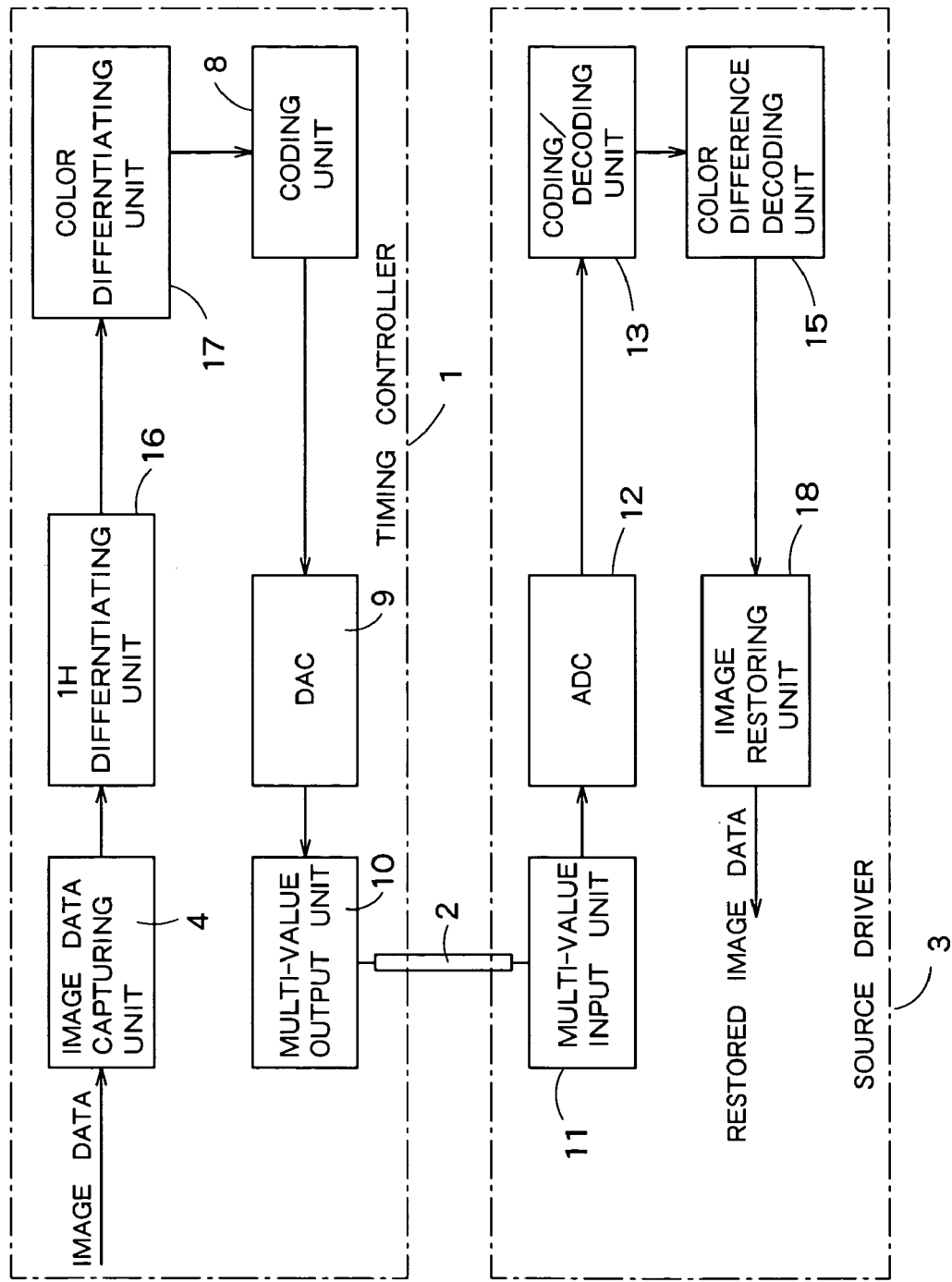
FIG. 21 is a block diagram illustrating the image transmitting system according to a modified example of FIG. 19.

FIG. 21 is a block diagram illustrating the image transmitting system according to a modified example of FIG. 19. The image transmitting system in FIG. 21 is characterized in the way that after a 1H differentiating unit 16 calculates the 1H differential data, a color differentiating unit 17 differentiates color. In the source driver 3 that receives the multi-valued data, after a color difference decoding unit 15 restores the 1H differential signal using the multi-valued data, an image restoring unit 18 restores the 1H differential signal as the original image data. In the case where 1H difference is utilized, the correlation is low, and its capability to reduce current consumption is inferior to that of MED. However, this 1H case has a benefit that the hardware structure can be simplified. Thereafter, the case of 1H difference will be explained for a while, but the 1H difference may be suitably replaced by MED difference.

FIG. 22 illustrates one example of a data flow chart in the image transmitting system in FIG. 19. On the left side of FIG. 22 shows a publicly known data flow chart. This publication adopts a so-called vertical differentiating system (VDE system) in which the RGB image data are converted into the 1H differential data, the data are transmitted from the LCD controller to the LCD source driver 3, and the RGB image data are reconstructed from the 1H differential data by the LCD source driver 3. In this VDE system, the property of 1H correlation of image is exploited to the EMI reduction. Its details are described as follows: after the 1H differential data are generated in the timing controller 1 (step S1), the differential data are transmitted in binary data from the timing controller 1 to the source driver 3 (step S2). The original differential data are restored in the source driver 3 (step S3), and the original image data are finally obtained (step S4).

On the other hand, in this embodiment, the 1H correlation is used not for the EMI reduction but for the reduction of count of wirings. The 1H differentiated data are transmitted not as binary data. By using this color differentiation and this multi-valuation, reduction of wiring count is attained.

After the timing controller 1 carried out color differentiation and generates color difference data (step S5), it generates 1H color difference-differential data (step S6). The color differentiation gives a higher correlation compared with that of the 1H difference (1H difference has inferior correlation as explained by the statistics in FIG. 7).

The 1H color difference-differential data are encoded to multi-valued data (step S7). In this multi-valuation, the 1H color difference-differential data are encoded into physical data (electric current amplitude or voltage amplitude) as the image data. As a result, the data rate is improved. In this embodiment, for example, the multi-valued data such as 4-valued, 8-valued, 16-valued, 32-valued are generated.

FIG. 22 illustrates an example where the data are multi-valued into 64-valued data, but this is merely one example. As the level of multi-valuation is higher, the data rate increases, and thus the count of the wirings 2 can be further reduced. For example, in the case where binary data are transmitted using 12 wirings, 4-valued data are transmitted using six wirings, 8-valued data are transmitted using four wirings, 16-valued data are transmitted using three wirings, and 64-valued data are transmitted using two wirings.

In the example of FIG. 22, a multi-valued current as data is transmitted from the timing controller 1 to the source driver 3 (step S8). When the source driver 3 receives the multi-valued current (step S9), the multi-valued current is converted to obtain original color difference data (step S10), and the color difference data is converted to the original differential data (step S3), to restore original image data (step S4).

Figure 23:
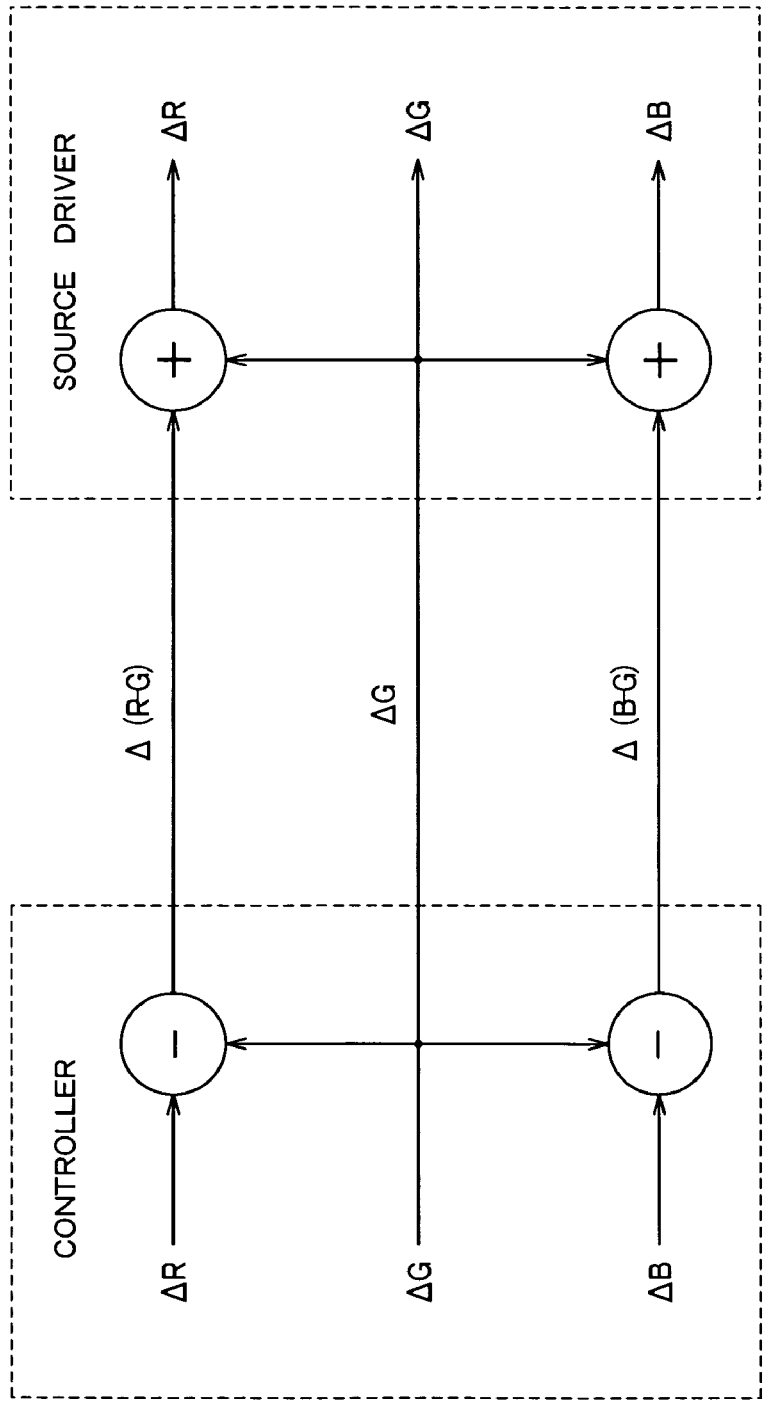
FIG. 23 is a diagram explaining the color differentiating of the 1H differential signal.

FIG. 23 is a diagram explaining the color differentiation of the 1H differential signal. Let $\Delta$ denote the 1H differentiation. Since $\Delta(R-G)=\Delta R-\Delta G$ and $\Delta(B-G)=\Delta B-\Delta G$, color difference signals $\Delta(R-G)$ and $\Delta(B-G)$ are calculated from $\Delta R$, $\Delta G$ and $\Delta B$ which are 1H-differentiated in the timing controller 1, then three data $\Delta(R-G)$, $\Delta G$, $\Delta(B-G)$ are transmitted.

After the source driver 3 receives the three data, the three data are reconstructed by the decoding according to the inverse calculations: $\Delta R=\Delta(R-G)+\Delta G$ and $\Delta B=\Delta(B-G)+\Delta G$.

Figure 24:
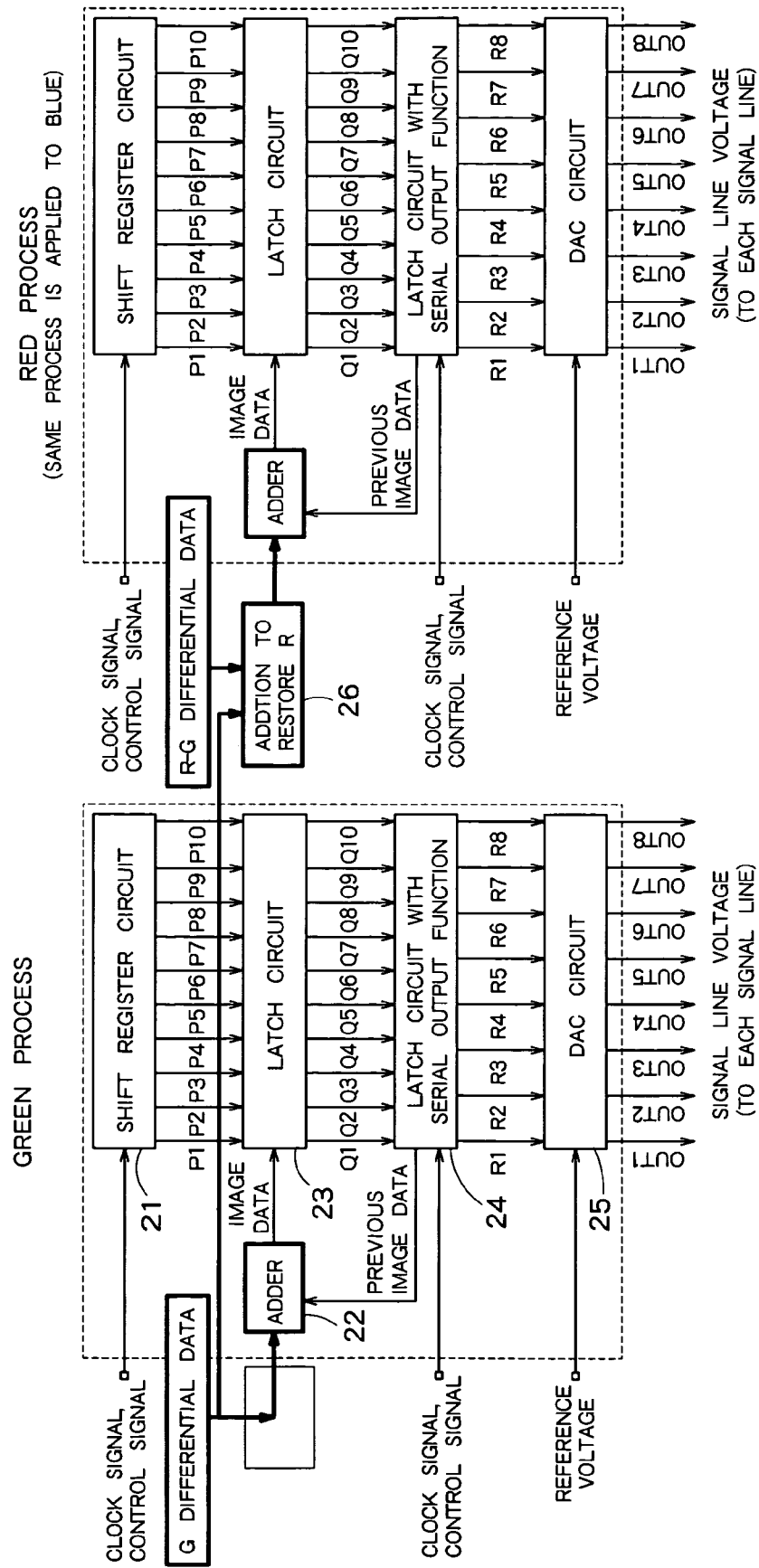
FIG. 24 is a block diagram illustrating one example of an internal constitution of the source driver 3.

FIG. 24 is a block diagram illustrating one example of an internal constitution of the source driver 3. The source driver 3 in FIG. 24 has a shift register circuit 21 which is controlled by a shift clock, an image data adder 22, a latch circuit 23 which latches image data, a latch circuit 24 with a serial output function, and a DAC circuit 25 for each color RGB.

The adder 22 adds the current differential data and the 1H-previous image data latched by the latch circuit 24 in order to generate current image data. In this embodiment, an extra adder 26 is provided before the adder 22. Regarding to $\Delta G$, as the 1H differential data is directly available, such an extra adder is not necessary. On the other hand, the extra adders 26 are necessary for $\Delta R$ and $\Delta B$.

In the case where multi-valuation is carried out by using 1H difference, the 1H-previous image data in the source driver 3 is used, so that the hardware constitution can be reduced. In the case where multi-valuation is carried out by using MED difference, the MED predicting function cannot be realized only by the 1H-previous image data in the source driver 3, and a 1H memory should be additionally provided, so that the hardware constitution becomes complicated. However, MED difference should not be absolutely denied because of the disadvantage that the performance of 1H difference is inferior to that of MED difference. That is, 1H difference or MED difference may be selected according to application fields.

Instead of treating differential data, if necessary, there is a case that a reset signal is provided and image data itself (original, instead of differentiated) is transmitted. For example, in the case or the like where differential data are not within the range of a predetermined number of bits, the image data itself is preferable to transmit in a limited data size format to prevent deterioration of image.

The details will be explained on the mechanism that multi-valuation is carried out on differential data (data such as 1H color difference-differential data and MED color difference-differential data). The multi-valuation will be composed of the two steps. The first is the step of defining a coding table that maps a difference with gradation index $\epsilon$ to bit string $\Delta$. FIG. 25 is a diagram illustrating this map.

It is temporal treatment that the processing bit depth is 8. Any bit depth may be generally acceptable: the processing bit depth should be adjusted according to the depth of the coding bits of an image. The value of the bit depth itself is not necessarily equal to the processing bit depth. It may be necessary to add 1 bit due to differentiation in some cases.

Now, the detail will be explained on how to construct the map table in FIG. 25. Let $\Delta 7$ denote the bit string $\Delta$ on the MSB, and $\Delta 0$ designates the bit string $\Delta$ on the LSB. Since occurrence probabilities are approximated by Laplacian distribution probability $p(\epsilon)$ of differential data $\epsilon$ as gradation index, the differential data $\epsilon$ are arranged in the increasing order of their absolute values (small gradation first), with alternately changing its signs +/−. This means that the differential data are arranged in the decreasing order of the probability (high probability first). That is to say, $p(0)>p(1)=p(-1)>p(2)=p(-2)>\ldots$ Needless to say, this order will be given as the probability order given by the statistical macro model. The analyzed results of individual images are not always identical to such a probability order. As to the gradation index $\epsilon$ arranged in the above order, the bit string $\Delta$ is constructed as the following. Natural numbers 0, 1, 2, 3, ... are allocated sequentially from up to down with small first. Then, the binary notation of natural number gives the bits string of $\Delta$. For example, when a natural number 3 is allocated to the gradation index 2, its bit string is 00000011 with binary notation, and thus $\Delta 0=1$, $\Delta 1=1$, $\Delta 2=0$, $\Delta 3=0$, $\Delta 4=0$, $\Delta 5=0$, $\Delta 6=0$, and $\Delta 7=0$. The allocation is utilized to suppress the probabilities that each bit become 1 as small as possible.

Further, for example, the probability of $\Delta 0=1$ is given by $p(1)+p(2)+p(3)+p(4)+\ldots+p(127)$. This is because the probability of $\Delta 0=1$ is obtained by summing up all probabilities for the gradation index $\epsilon$ such that $\Delta 0=1$ in bits string $\Delta$. Since $p(1)=p(-1)$, the role for 1 and −1 can be swapped.

Similarly, another swapping of role for $\epsilon$ and $-\epsilon$ is available too. Further, since slight fluctuation in the probability does not affect a role of gradation index $\epsilon$ in a global sense, the arranging order of gradation $\epsilon$ may be slightly changed.

Further, consider the case that the sum of probabilities is not substantially affected when $p(\epsilon)$ is an extremely small for large gradation index $\epsilon$. In this case, the arranging order may be changed. FIG. 25 illustrates just one example that associates the bit string A with the probability $p(\epsilon)$. So, the map table is not limited to the example in FIG. 25. Another consideration on the size of the coding hardware may give another acceptable mapping (the association of $\epsilon$ to $\Delta$).

Since there are the three MED color difference-differential data, there exist three bit strings $\Delta$. Let $\Delta G$ denote the bit string of $\epsilon G$, where $\epsilon G$ is gradation index for G, and the color difference data is encoded with $\epsilon G$. Similarly, let $\Delta(R-G)$ denote the bit string of $\epsilon(R-G)$, and let $\Delta(B-G)$ denote the bit string of $\epsilon(B-G)$. The map, which maps gradation index $\epsilon$ to bit string $\Delta$, is called as "channel bit generating map". The bit string A will be called as "channel bit", when the existence of the channel is particularly aware of. Accurately speaking, multi-values corresponding to the bit string $\Delta$ are transmitted on the channels, and the bit string $\Delta$ itself is not directly transmitted on the channels. It should be understood that the bit string is the intermediate data that generates multi-valued values. In this sense, the channel bit should be accurately called as "bits for generating a multi-valued channel signal", but the simple name "channel bit" is given, because its suffix qualification is too long.

In JPEG-LS, Golomb codes correspond to the above bit map. The Golomb code is a coding technology in which codes are devised in order to reduce bit length for compression. In "the channel bit generating map" of the present invention, its bit length is not particularly reduced. The fixed bit length property of the present invention is different from the Golomb coding. In the example of FIG. 25, the length is fixed to 8-bit length. In the present invention, multi-value coding is finally devised in order to reduce average electric current amplitude by a "multi-valuation map" which will be explained below.

Now the first step will be explained. Let $\phi\epsilon(B)$ denote the 1-coccurrence probability of the data bit B for the gradation index $\epsilon$. Consider the case that gradation coding is $enc(\epsilon) \to s1s2 \ldots sn$ (0 or 1 is allocated to sj) and $sj(1 \leq j \leq n)$ is selected for B. Let $\phi\epsilon(B)=p(\epsilon)$ when B=1, and let $\phi\epsilon(B)=0$ when B=0. Then, the function $\phi(B)$ is defined by the sum: $\phi(B)=\Sigma\phi\epsilon(B)$. The sigma represents the sum of 1-occurrence probabilities running all over the gradation indices $\epsilon$.

In the above, B is defined for respective sj in $s1s2 \ldots sn$. The function $\phi$ is defined based on $p(\epsilon)$, but it is not directly defined by $p(\epsilon)$ itself and is defined via the gradation coding enc. For this reason, different character symbol (p and $\phi$) are intentionally used here for two kinds of probability, and different two concepts are clearly discriminated by these two symbols.

Figure 26:
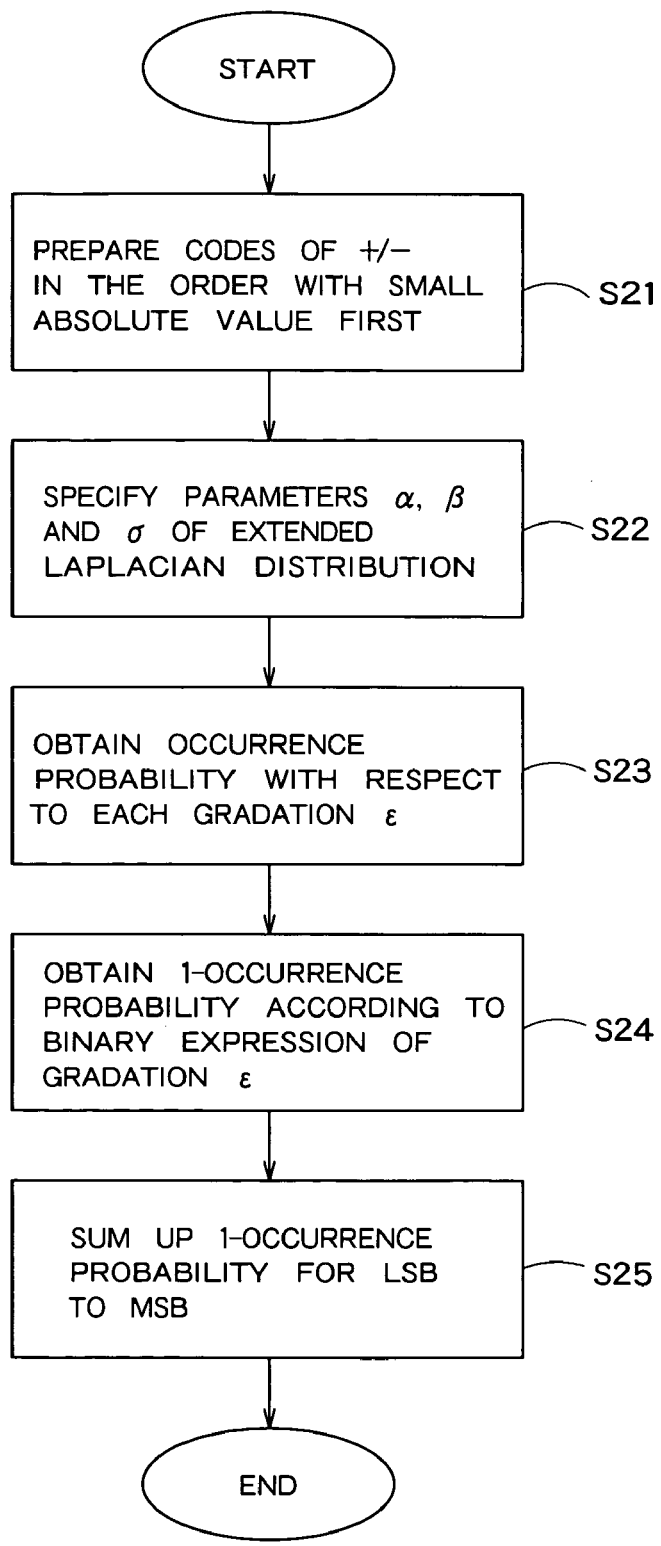
FIG. 26 is a flowchart illustrating one example of a processing procedure for calculating probability using the statistical model (extended Laplacian distribution) of an image.

Next, the method will be shown to calculate the bit probability $\phi(B)$. FIG. 26 is a flowchart illustrating one example of a processing procedure to calculate probability using the statistical model (extended Laplacian distribution) of an image. The flowchart roughly consists of five steps.

As an absolute value of the gradation index $\epsilon$ of the Laplacian distribution becomes smaller, the 1-occurrence probability associated with $\epsilon$ become higher. For this reason, the gradation indices are arranged, with alternately changing signs +/− in the order, such as $0, +1, -1, +2, -2, \ldots$, to prepare code allocation (step S21).

Parameters of the extended Laplacian distribution are given (step S22). The occurrence probability is calculated for each gradation index (step S23). The codes are allocated to the gradation indices, and a 1-occurrence probability of each bit is calculated from the 1-occurrence probability for each gradation index (step S24).

Next as to all the gradation indices, "probabilities that LSB is 1" are summed up, and a 1-occurrence probability $\phi$ of the LSB that LSB in the coding bit is "1" is calculated (step S25). Similarly, 1-occurrence probabilities $\phi(B)$ of bit B that all the bits up including MSB is "1" are calculated.

The second step will be explained below. The second step will define a multi-valuation map. At first, the basic concept will be explained by giving a concrete example of the multi-valuation map relating to $\Delta G$, and then formal definition will be given. The multi-valuation map where $\Delta G$, $\Delta(R-G)$ and $\Delta(B-G)$ data are used will be actually utilized later.

In order to explain the basic concept on multi-valuation, the simple example that use only $\Delta G$ will be given as beginning. Let $\Delta G0$, $\Delta G1$, $\Delta G2$, $\Delta G3$, $\Delta G4$, $\Delta G5$, $\Delta G6$ and $\Delta G7$ denote LSB to MSB of (8 bits) $\Delta G$, where $\Delta Gx$ (x=0 to 7) takes 0 or 1 as its value.

Considering a 4-valued multi-valuation map, for example, a 4-valued data $2*\Delta G7+\Delta G6$ may be generated by the two bits $\Delta G6$ and $\Delta G7$. This expression stands for the generation of single electric current amplitude (or voltage amplitude) from the two bits $\Delta G6$ and $\Delta G7$. Thus, this expression should be called as a "bit allocation expression". Similarly, the bit allocation expressions $2*\Delta G5+\Delta G4$, $2*\Delta G3+\Delta G2$ and $2*\Delta G1+\Delta G0$ are considered, so that four sets of 4-valued data are constituted for 8-bit data.

A set of the plural bit allocation expressions with using all bits $\{2*\Delta G7+\Delta G6, 2*\Delta G5+\Delta G4, 2*\Delta G3+\Delta G2$ and $2*\Delta G1+\Delta G0\}$ illustrates an example of the multi-valuation map. As to three data $\Delta G$, $\Delta(R-G)$ and $\Delta(B-G)$ where single pixel consists of 24 bits, the similar multi-valuation map can be given. A bit allocation expression needs not to be always constituted by bits of the same color (color by color). For example, when G and (R−G) are mixed, the bit allocation expression $2*\Delta G1+\Delta(R-G)0$ may be constituted. The required condition is that all 24 bits are used as arguments without any loss.

Before giving the formal definition of the multi-valuation map, the "argument set" shall be defined. Let MVLk be an element of a set MVL of allocation expression, that is, MVLk is an allocation expression (k is a index for MVL). Let an arg(MVLk) be the set of arguments of MVLk. Then the argument set arg(MVL) of the entire MVL is defined as the set union U arg(MVLk).

The multi-valuation map MVL of the bit string $B=B1B2 \ldots Bn$ (element Bj (j=1 \ldots n)) with length n is defined as a set $\{MVLk\}$ of maps MVLk: $B1j \times \ldots \times Bmj \to INT$ (its domain is a domain product of bit, and its range INT is integer), and the following conditions are to be satisfied. Accurately speaking, it should be called as "the set of the multi-valuation maps", but it is simply called as "multi-valuation map" here.

$\text{arg}(MVL)$ includes all elements $B1B2 \ldots Bn$ of B, (1)

$MVLk(B1j, B2j, \ldots) = \Sigma Bij * \text{power}(2,i)$ (2)

In the (2), the sum is obtained running all i, and $B1jB2j \ldots$ is binary notation of MVLk. Actually, the value of the bit string B is the bit string $\Delta$ generated at the first step, but this bit string is denoted by B in order to conceptually discriminate it from the bit string $\Delta$ for definition.

Each expression in the multi-valuation map is called as a bit allocation expression. A bit allocation expression generates a physical quantity (an electric current amplitude or a voltage amplitude or a physical quantity like that), which carries a signal of a given binary data. The case where an electric current carries information (current mode) will be explained, but the present invention is not limited to this case. However, by concerning about EMI in data transmission, the electric current is more preferable than the voltage. The explanation below will be restricted to only $\Delta G$ for sake of simplicity as first discussion. Let I denote reference unit current amplitude. The above multi-valuation map means that the following 4-valued electric currents flows in the four wirings 2:

$$(2*\Delta G7+\Delta G6)*I$$

$$(2*\Delta G5+\Delta G4)*I$$

$$(2*\Delta G3+\Delta G2)*I$$

$$(2*\Delta G1+\Delta G0)*I$$

satisfying the condition that all of $\Delta G$ data for single pixel are included in the map. This will be formulated in term of the MVL definition as follows:

MVL1: $2*\Delta G7+\Delta G6$

MVL2: $2*\Delta G5+\Delta G4$

MVL3: $2*\Delta G3+\Delta G2$

MVL4: $2*\Delta G1+\Delta G0$

Here, MVL={MVL1, MVL2, MVL3, MVL4}, arg(MVL1)={$\Delta$G7, $\Delta$G6}, arg(MVL2)={$\Delta$G5, $\Delta$G4}, arg (MVL3)={$\Delta$G3, $\Delta$G2}, arg(MVL4)={$\Delta$G1, $\Delta$G0}, and arg (MVL)={$\Delta$G7, $\Delta$G6, $\Delta$G5, $\Delta$G4, $\Delta$G3, $\Delta$G2, $\Delta$G1, $\Delta$G0}. Note again that Arg(MVL) includes all the bits of $\Delta G$.

In a multi-valuation where its bit is not associated particularly with statistical meaning as a general scheme, as all bit of $\Delta Gx$ generates 0 or 1 uniformly, current amplitude increases in proportion to levels of a general multi-valuation with probability of 1/2. For example, current amplitude is doubled for 4-valued data. When data are 64-valued, the count of wirings is reduced in the similar way, but the current amplitude becomes 32 times larger. That is, when a general multi-valuation is adopted, this is a serious problem.

This embodiment on multi-valuation is characterized in the way that the electric current amplitude is suppressed by exploiting the facts on statistical deviation. The 1-occurrence probability of $\Delta G$ on the LSB ("1-occurrence" means the bit takes the value "1") is high, and the 1-occurrence probability of $\Delta G$ on the MSB is low. When exploiting such statistical deviation (statistical property), the statistical average of the electric current amplitude is requested to be smaller. Let's start with the simplest case: the case where single multi-valued data are composed of 8 bits from $\Delta G0$ to $\Delta G7$ and the multi-valuation map is composed of the following bit allocation expression:

$$8*\Delta Gx+4*\Delta Gx+2*\Delta Gx+\Delta Gx$$

where Gx is G0 to G7. Let $\phi(B)$ denote the 1-occurrence probability of the bit B. In order to explain further, instances of such 1-occurrence probability are given for example as follows:

$\phi(\Delta G0)=0.38, \phi(\Delta G1)=0.38, \phi(\Delta G2)=0.33,$
$\phi(\Delta G3)=0.26, \phi(\Delta G4)=0.19, \phi(\Delta G5)=0.11,$
$\phi(\Delta G6)=0.05, \phi(\Delta G7)=0.02.$ The above values of 1H difference are instantiated merely as examples. The explanation will be given hereafter by using the above values of 1H difference. DPCM may give different values, but the similar explanation can be given thereto. Now consider the comparison between the following two maps:

$$8*\Delta G0+4*\Delta G2+2*\Delta G4+\Delta G6 \qquad (2)$$

$$8*\Delta G1+4*\Delta G3+2*\Delta G5+\Delta G7 \qquad (3); \text{and}$$

$$8*\Delta G7+4*\Delta G5+2*\Delta G3+\Delta G1 \qquad (4)$$

$$8*\Delta G6+4*\Delta G4+2*\Delta G2+\Delta G0 \qquad (5)$$

In the expressions (2) and (3), the bits are allocated so that the probability is high on the MSB side (such as $\Delta G0$ and $\Delta G1$). On the other hand, in the expressions (4) and (5), the bits are allocated so that the probability is low on the MSB side (such as $\Delta G7$ and $\Delta G6$). It is a natural guess that the expressions (2) and (3) have larger values than (4) and (5) because the 1-occurrence probability of the MSB side (such as $\Delta 0$ and $\Delta 1$) is high. In this embodiment, the expressions of (4) and (5) are intentionally selected in the above two maps, to reduce the average amplitude of electric current (or voltage).

Another example using a plurality of expressions will be explained below. The above example concretely gave numerical values for the probability. Instead of this, the next will be explained by using the property of $\phi(\Delta Gi)$ to make more general discussion. In the multi-valuation map of the expression (6) below, the average amplitude of electric current (voltage) is expected to be smaller than that of the multi-valuation map of the expressions (7).

$$\{2*\Delta G7+\Delta G0, 2*\Delta G6+\Delta G1, 2*\Delta G5+\Delta G2, 2*\Delta G4+\Delta G3\} \qquad (6)$$

$$\{2*\Delta G7+\Delta G6, 2*\Delta G5+\Delta G4, 2*\Delta G3+\Delta G2, 2*\Delta G1+\Delta G0\} \qquad (7)$$

The expected value I1 of current amplitude in the expression (7) is given by the following expression (8), and the expected value I2 of current amplitude in the expression (6) is given by the following expression (9).

$$2*\{\phi(\Delta G7)+\phi(\Delta G5)+\phi(\Delta G3)+\phi(\Delta G1)\}+\phi(\Delta G6)+\phi(\Delta G4)+\phi(\Delta G2)+\phi(\Delta G0\phi) \qquad (8)$$

$$2*\{\phi(\Delta G7)+\phi(\Delta G6)+\phi(\Delta G5)+\phi(\Delta G4)\}+\phi(\Delta G3)+\phi(\Delta G2)+\phi(\Delta G1)+\phi(\Delta G0) \qquad (9)$$

The difference between the two expected values I1 and I2 is obtained according to the following expression (10):

$$\phi(\Delta G7)+\phi(\Delta G5)+\phi(\Delta G3)+\phi(\Delta G1)-\phi(\Delta G7)-\phi(\Delta G6)-\phi(\Delta G5)-\phi(\Delta G4)=\phi(\Delta G3)+\phi(\Delta G1)-\phi(\Delta G6)-\phi(\Delta G4)=\phi(\Delta G3)-\phi(\Delta G6)+\phi(\Delta G1)-\phi(\Delta G4)>0 \qquad (10)$$

A rule $\phi(\Delta Gi)>\phi(\Delta G(i+1))$ suggests the fact that 1-occurrence probability of MSB is lower than that of LSB. The rule implies that $\phi(\Delta G3)>\phi(\Delta G6)$ and $\phi(\Delta G1)>\phi(\Delta G4)$, and finally it concludes I1-I2>0 in (10). Therefore, I1>I2, and the average amplitudes of the expression (6) are now improved to be lower than that of the expression (7).

In this embodiment, such calculation should include the calculations not only on $\Delta G$ but also $\Delta(R-G)$ and $\Delta(B-G)$ for actual applications. Then, the explanation of the simple first introduction example is finished.

Figure 27:
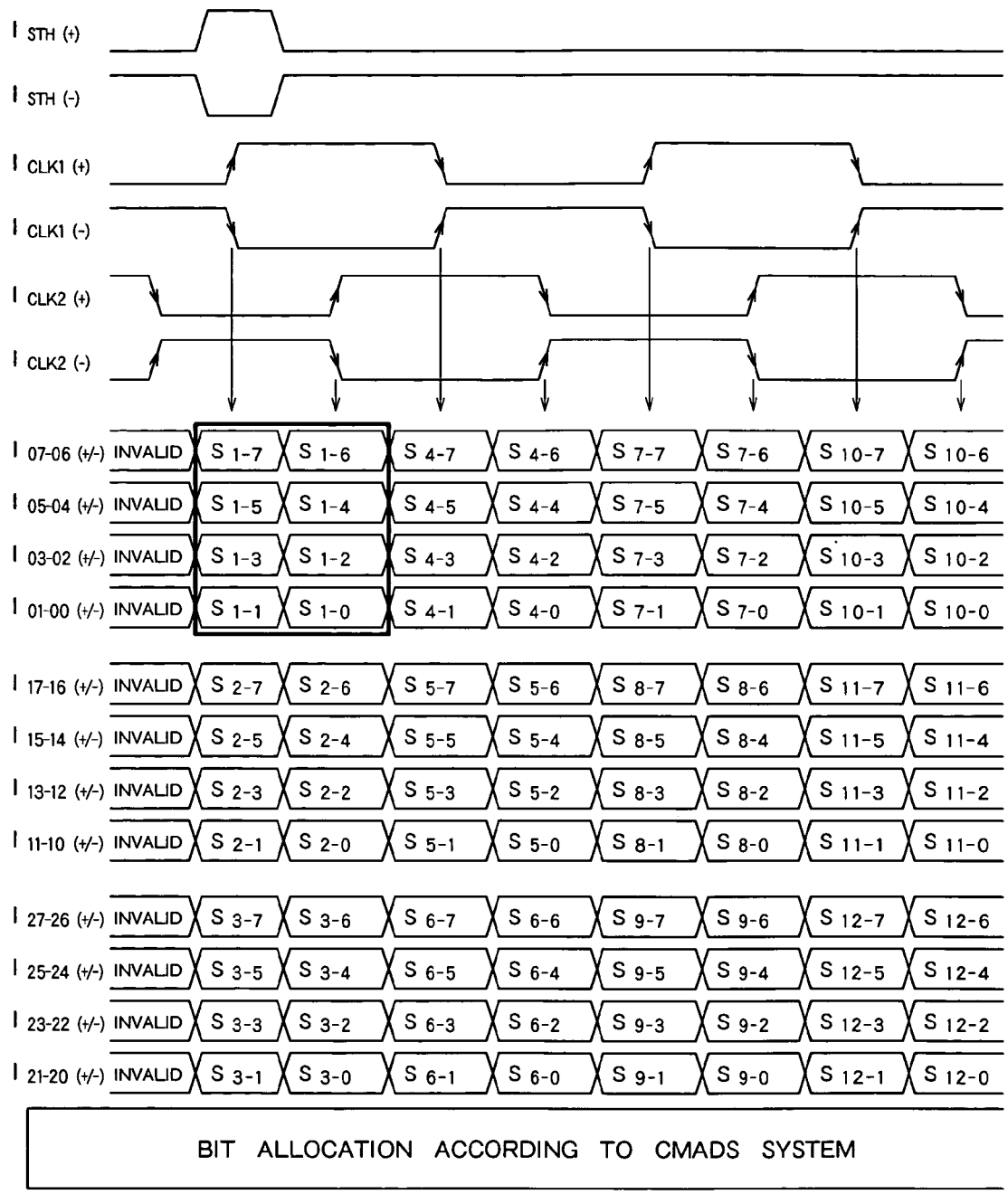
FIG. 27 is a timing chart of the data transmission in the case where the CMADS system is adopted.

Next, the explanation on RGB data will be given. FIG. 27 is a timing chart of the data transmission in the CMADS, and illustrates an example that data are transmitted using by 12 pairs of wirings. In this case, in order to transmit single 8-bit pixel data (one of R, G and B), four wirings are used for 2CLK periods. As single pixel includes RGB data as a whole, twelve (12=3*4) wirings are required for the 2CLK periods. The binary data (0 and 1) are transmitted via each wiring, and for example, 8 bits (for example for R) including S1-0, S1-2 ... to S1-7 are transmitted in an arrangement of 2×4. This transmission scheme is common to the other wirings.

In CMADS, any slot position is swappable in the data arrangement. Similarly, in this embodiment, any slot position is swappable. This is a general property on a transmission format.

FIG. 28 is a timing chart of the data transmission by the present embodiment. In this embodiment, a single wire in the two wirings carries the 8-bit RGB single pixel data for 4 clock periods. Multi-valued data of 64 values are transmitted on each wiring. For example, the differential data $\Delta G$ is 64-valued data given by the following expression (11):

$$32*\Delta G5+16*\Delta G4+8*\Delta G3+4*\Delta G2+2*\Delta G1+\Delta G0 \quad (11).$$

Similarly, the following three multi-valued data are generated by using the differential data $\Delta G$, $\Delta(B-G)$ and $\Delta(R-G)$.

$$32*\Delta(B-G)5+16*\Delta(B-G)4+8*\Delta(B-G)3+4*\Delta(B-G)2+2*\Delta(B-G)1+\Delta(B-G)0 \quad (12)$$

$$32*\Delta(R-G)5+16*\Delta(R-G)4+8*\Delta(R-G)3+4*\Delta(R-G)2+2*\Delta(R-G)1+\Delta(R-G)0 \quad (13)$$

$$32*\Delta(R-G)7+16*\Delta(B-G)7+8*\Delta G7+4*\Delta(R-G)6+2*\Delta(B-G)6+\Delta G6 \quad (14)$$

In FIG. 28, the multi-valued data in the expression (11) are transmitted at the slot (a), and the multi-valued data in the expression (12) are transmitted at the slot (b). The multi-valued data in the expression (13) are transmitted at the slot (c), and the multi-valued data in the expression (14) are transmitted at the slot (d).

Since "the 1-occurrence probability of the MSB of $\Delta G$" is low, in order to reduce the average of current amplitude, the MSB bit in higher position is intentionally allocated in the expression of the map. This is a simple allocation strategy such that 6 bits are allocated from LSB to MSB successively color by color. That is, the first three expressions are formed by the bit terms from higher bit to lower (from left to right: $5^{th}$ to LSB), and the highest bits (MSB and $6^{th}$ bit) form the last expression. In this case, the average of current amplitude is 5.2. With the rest single wiring in FIG. 28 (not marked with the labels), multi-valued data of adjacent pixel are transmitted similarly. That is, data for two pixels are transmitted on two wirings for 4 clock periods. The arrangement of the multi-valued data is not limited to this: the clock period and the arrangement may be freely modified or swapped as long as all the pixel data can be transmitted without loss.

In addition, FIG. 29 is a timing chart of the data transmission of the multi-valuation map, which improves the average amplitude better than that in FIG. 28. The average of current amplitude in this case is 3.0. The 64-valued multi-valuation map B in FIG. 29 is given by the following expressions (15) to (18).

$$32*\Delta(R-G)7+16*\Delta G6+8*\Delta(R-G)4+4*\Delta(B-G)2+2*\Delta G3+\Delta G0 \quad (15)$$

$$32*\Delta(B-G)7+16*\Delta G7+8*\Delta(B-G)4+4*\Delta(R-G)2+2*\Delta(R-G)1+\Delta G1 \quad (16)$$

$$32*\Delta(R-G)6+16*\Delta(B-G)5+8*\Delta G5+4*\Delta G4+2*\Delta(B-G)1+\Delta G2 \quad (17)$$

$$32*\Delta(B-G)6+16*\Delta(R-G)5+8*\Delta(R-G)3+4*\Delta(B-G)3+2*\Delta(R-G)0+\Delta(B-G)0 \quad (18)$$

In the expressions (15) to (18), the multi-valued data are not generated "color by color" as the map in the FIG. 29, but instead of "color by color" scheme, the 64-valued map is generated with the following strategy: all the probabilities of $\Delta B$, $\Delta(R-G)$ and $\Delta(B-G)$ are calculated first, then the data are arranged in the order of lower probability first from the MSB to LSB. In FIG. 29, the multi-valued data given by the expression (15) are assigned to the slot (e), the multi-valued data given by the expression (16) are assigned to the slot (f), the multi-valued data given by the expression (17) are assigned to the slot (g) and the multi-valued data given by the expression (18) are assigned to the slot (h).

The calculating procedure for the average of current amplitude in the multi-valuation maps in FIGS. 28 and 29 will be explained below. The following list of probability is calculated based on the map given by FIG. 25. This calculation uses the parameters of the extended Laplacian distribution given in FIGS. 10 to 13, which are computed as the average value.

$\phi(\Delta G0)=0.388544$ $\phi(\Delta G1)=0.388544$ $\phi(\Delta G2)=0.335163$ $\phi(\Delta G3)=0.267798$ $\phi(\Delta G4)=0.191600$ $\phi(\Delta G5)=0.117569$ $\phi(\Delta G6)=0.058535$ $\phi(\Delta G7)=0.021991$ $\phi(\Delta(R-G)0)=\phi(\Delta(B-G)0)=0.3031159$ $\phi(\Delta(R-G)1)=\phi(\Delta(B-G)1)=0.3031159$ $\phi(\Delta(R-G)2)=\phi(\Delta(B-G)2)=0.2212769$ $\phi(\Delta(R-G)3)=\phi(\Delta(B-G)3)=0.1354912$ $\phi(\Delta(R-G)4)=\phi(\Delta(B-G)4)=0.063908$ $\phi(\Delta(R-G)5)=\phi(\Delta(B-G)5)=0.00207737$ $\phi(\Delta(R-G)6)=\phi(\Delta(B-G)6)=0.0040364$ $\phi(\Delta(R-G)7)=\phi(\Delta(B-G)7)=0.0003916$ In this embodiment, shown as the above procedure, the scheme of probability assignment is fixed for all type of images. As a result, the coding and decoding can be carried out without changing the multi-valuation map according to images. This means that the hardware implementation of this embodiment is static.

In addition, since the average value here is the average value of the electric current amplitude that is statistically expected, it is just predicted without the relation to hardware. The hardware implementation does not include the computation process to obtain the probability values. The probability described here is just the tool to estimate the effects of our coding technology and this is within the range of the general concept of the entropy coding.

Next, the calculation of the multi-valued data will be explained by using the 64-valued multi-valuation map A. In the expression (12) and (13), since the probabilities of $\Delta(B-G)$ and $\Delta(R-G)$ are the same each other, also the values of the multi-valued data are the same each other. Then calculate the value of Δ(R−G) as follow. In order to get the average value, we must apply the function φ to the expression (12) or (13): the average value is given in (19).

$$32*\phi(\Delta(R-G)5)+16*\phi(\Delta(R-G)4)+8*\phi(\Delta(R-G)3)+4*\phi(\Delta(R-G)2)+2*\phi(\Delta(R-G)1)+\phi(\Delta(R-G)0)= \\ 32*0.303+16*0.303+8*0.221+4*0.135+ \\ 2*0.063+0.002=4.565 \quad (19)$$

The average amplitude value of multi-valued data in the expression (11) is calculated according to (20).

$$32*\phi(\Delta G5)+16*\phi(\Delta G4)+8*\phi(\Delta G3)+4*\phi(\Delta G2)+2*\phi(\Delta G1)+\phi(\Delta G0)=32*0.388+16*0.388+8*0.335+ \\ 4*0.267+2*0.191+0.117=11.476 \quad (20)$$

The average amplitude value of the multi-valued data in the expression (14) is calculated according to (21).

$$32*\Delta(R-G)7+16*\{(B-G)7+8*\Delta G7+4*\Delta(R-G)6+2*\Delta(B-G)6+\Delta G6=32*0.0003+16*0.0003+8*0.021+ \\ 4*0.004+2*0.004+0.058=0.277 \quad (21)$$

Now, another computation will be given by using the 64-valued multi-valuation map.

The average amplitude of the multi-valued data in the expression (15) is 3.269, the one for the expression (16) is 2.755, the one for the expression (17) is 3.109, and the one for the expression (18) is 0.129. The average of these four average values is 3.032.

The above two computations for average amplitude concludes that the average value of amplitude is improved from 5.2 to 3.0, by replacing the multi-valuation map from A to B. The list of values for bit probability function is sorted lower probability first as follows:

$\phi(\Delta(R-G)7)=\phi(\Delta(B-G)7)$ $\phi(\Delta(R-G)6)=\phi(\Delta(B-G)6)$ $\phi(\Delta(R-G)5)=\phi(\Delta(B-G)5)$ $\phi(\Delta G7)$ $\phi(\Delta G6)$ $\phi(\Delta(R-G)4)=\phi(\Delta(B-G)4)$ $\phi(\Delta G5)$ $\phi(\Delta(R-G)3)=\phi(\Delta(B-G)3)$ $\phi(\Delta G4)$ $\phi(\Delta(R-G)2)=\phi(\Delta(B-G)2)$ $\phi(\Delta G3)$ $\phi(\Delta(R-G)1)=\phi(\Delta(B-G)1)$ $\phi(\Delta(R-G)0)=\phi(\Delta(B-G)0)$ $\phi(\Delta G2)$ $\phi(\Delta G1)$ $\phi(\Delta G0)$ The multi-valuation map B allocates the bits in the order that higher-order bits are allocated to the lower probabilities. In this map, the allocation order is switched alternatively by the right-to-left scan and the left-to-right scan when moving down along with the arrow of FIG. 32 such as the following switching: the bit strings Δ(R−G)7 to Δ(B−G)5 has left-to-right scanning, and the bit strings ΔG7 to Δ(R−G)3 has right-to-left scanning as shown in the FIG. 32.

In this embodiment, a map is not restricted to the multi-valuation map A nor the multi-valuation map B: any other multi-valuation maps may be exploited as long as such deviation of the probability is utilized. The allocation method may be modified in the multi-valuation map B as follows. A multi-valuation map B1 is defined in the another order in the single scanning direction: the lowest four bits Δ(R−G)7, Δ(B−G)7, Δ(R−G)6 and Δ(B−G)6 are assigned to MSB (the bits multiplied by 32), then the second lowest four bits Δ(R−G)5, Δ(B−G)5, ΔG7 and ΔG6 are assigned to second MSB (the bits multiplied by 16), and so forth.

$$32*\Delta(R-G)7+16*\Delta(R-G)5+8*\Delta(R-G)4+4*\Delta(B-G)3+2*\Delta G3+\Delta(B-G)0 \quad (22)$$

$$32*\Delta(B-G)7+16*\Delta(B-G)5+8*\Delta(B-G)4+4*\Delta G4+2*\Delta(R-G)1+\Delta G2 \quad (23)$$

$$32*\Delta(R-G)6+16*\Delta G7+8*\Delta G5+4*\Delta(R-G)2+2*\Delta(B-G)1+\Delta G1 \quad (24)$$

$$32*\Delta(B-G)6+16*\Delta G6+8*\Delta(R-G)3+4*\Delta(B-G)2+2*\Delta(R-G)0+\Delta G0 \quad (25)$$

In such a manner, some other variations will be devised for the multi-valuation map. It is not always necessary to carry out the allocation in the exactly same order to the sorted one just described above. In most cases, average of current amplitude is not so affected by the small updates of order as long as the associated probabilities are comparable. In this case, such disadvantage of slight increase in average amplitude may be acceptable. This multi-valuation map should be, therefore, designed according to not only the average of current amplitude but also various parameters. In addition to the exemplified multi-valuation maps, realization of another maps may be taken into consideration. For example, the following expressions (26) to (29) are proposed.

$$32*\Delta(R-G)7+16*\Delta(R-G)5+8*\Delta(R-G)4+4*\Delta(R-G)3+2*\Delta(R-G)1+\Delta(R-G)0 \quad (26)$$

$$32*\Delta(B-G)7+16*\Delta(B-G)5+8*\Delta(B-G)4+4*\Delta(B-G)2+2*\Delta(B-G)1+\Delta(B-G)0 \quad (27)$$

$$32*\Delta(R-G)6+16*\Delta G7+8*\Delta G5+4*\Delta(R-G)2+2*\Delta G3+\Delta G1 \quad (28)$$

$$32*\Delta(B-G)6+16*\Delta G6+8*\Delta(B-G)3+4*\Delta G4+2*\Delta G2 30\,\Delta G0 \quad (29)$$

In the above, the expressions are formulated by using the "color by color" scheme (that is, expression has only single color as bit term; for example, the expression (26) has only R−G bits, and the expression (27) has only B−G bits). This enables the local gathering of wiring color by color, so that the signal processing will be processed in locally connected hardware.

In the constitution of FIG. 23, Δ(R−G) is arranged on the upper portion, ΔG is arranged on the center portion, and Δ(B−G) is arranged on the lower portion. When the data are arranged as shown in FIG. 23, it is desirable that the wirings are made to be simple as much as possible. From this viewpoint, it is understood that the multi-valuation map A should not be abandoned as candidate without careful consideration.

The 16-valued multi-valuation map will be explained as another embodiment of the multi-valuation C. FIG. 30 shows a timing chart of the multi-valued data corresponding to the following multi-valuation map C.

$$8*\Delta(R-G)7+4*\Delta(R-G)3+2*\Delta(B-G)3+\Delta G0 \quad (30)$$

$$8*\Delta(B-G)7+4*\Delta G5+2*\Delta G4+\Delta G1 \quad (31)$$

$$8*\Delta(R-G)6+4*\Delta(B-G)4+2*\Delta(R-G)2+\Delta G2 \quad (32)$$

$$8*\Delta(B-G)6+4*\Delta(R-G)4+2*\Delta(B-G)2+\Delta(B-G)0 \quad (33)$$

$$8*\Delta(R-G)5+4*\Delta G6+2*\Delta G3+\Delta(R-G)0 \quad (34)$$

$$8*\Delta(B-G)5+4*\Delta G7+2*\Delta(R-G)1+\Delta(B-G)1 \quad (35)$$

The expected value in the expression (30) is 1.2046238, the expected value in the expression (31) is 0.8579721, and the expected value in the expression (32) is 1.0656397. The expected value in the expression (33) is 1.033593, the expected value in the expression (34) is 1.2390419, and the expected value in the expression (35) is 1.163502. The six expected values are averaged so that the average of current amplitude is 1.09.

In FIG. 30, the six multi-valued data according to the expressions (30) to (35) are serialized two by two so as to be transmitted via three wirings.

The above embodiment explains the example that the multi-valued data are composed of 16-valued values and 64-valued values, but they are merely just examples, and thus the present invention can be suitably applied to another multi-values such as 4-valued values, 8-valued values and 32-valued values.

In the embodiment, the above calculation is performed by the average value of the Laplacian distribution. As another choice, the Monte Carlo analyses may be performed on the parameter of the Laplacian distribution. FIG. 31 is a diagram illustrating frequency distribution of the electric current amplitude obtained by the Monte Carlo analysis: the normal distribution on the parameter of the Laplacian distribution.

In the case of the average value of the 64-valued multi-valuation map B, the average of current amplitude is 3.0, but when the Monte Carlo analysis is performed, the average value increased to 5.7.

Most population (occurrence by simulation is called "population" here) generated by Monte Carlo analyses is distributed intensively around the average value 3.0. The population of large electric current amplitude is low, but the distribution is approximately uniform up to around 20, and this distribution increase the average value. For this reason, the average of Monte Carlo is apt to larger than the average of the population concentrated around the center.

Similarly in the case of the multi-valuation map C with 16 values, as a result of the Monte Carlo analysis, the average value increases from 1.0 to 1.7. This result, however, means sufficiently profound effect in comparison with the case where the multi-valuation is carried out without any consideration. Since the average value is 32 by the 64-valued multi-valuation map and the average value is 8 by the 16-valued multi-valuation map, average of the electric current amplitude are reduced summarized as follows:

64-valuation: 32→5.7, therefore, reduced to 1/5.6 (the count of wirings: 12→2, therefore, reduced to 1/6); and 16-valuation: 8→1.7, therefore, reduced to 1/4.7 (the count of wirings: 12→3, therefore, reduced to 1/4).

It is understood that an average of the electric current amplitude is reduced to 1/5 (greatly reduced by 80%). That is to say, the reduction in the count of the wirings is achieved, and simultaneously the average of the electric current amplitude can be suppressed.

The above explains the details of the techniques by exploiting 1H difference mainly as the statistical deviation of an image. The technical idea of the inventors suggests that any statistics as long as the statistical deviation can be generally utilized. From such a viewpoint, the statistical deviation, relating to a difference in an adaptive prediction coding (it is used as an prediction coding like JPEG-LS), may be naturally exploitable.

Figure 32:
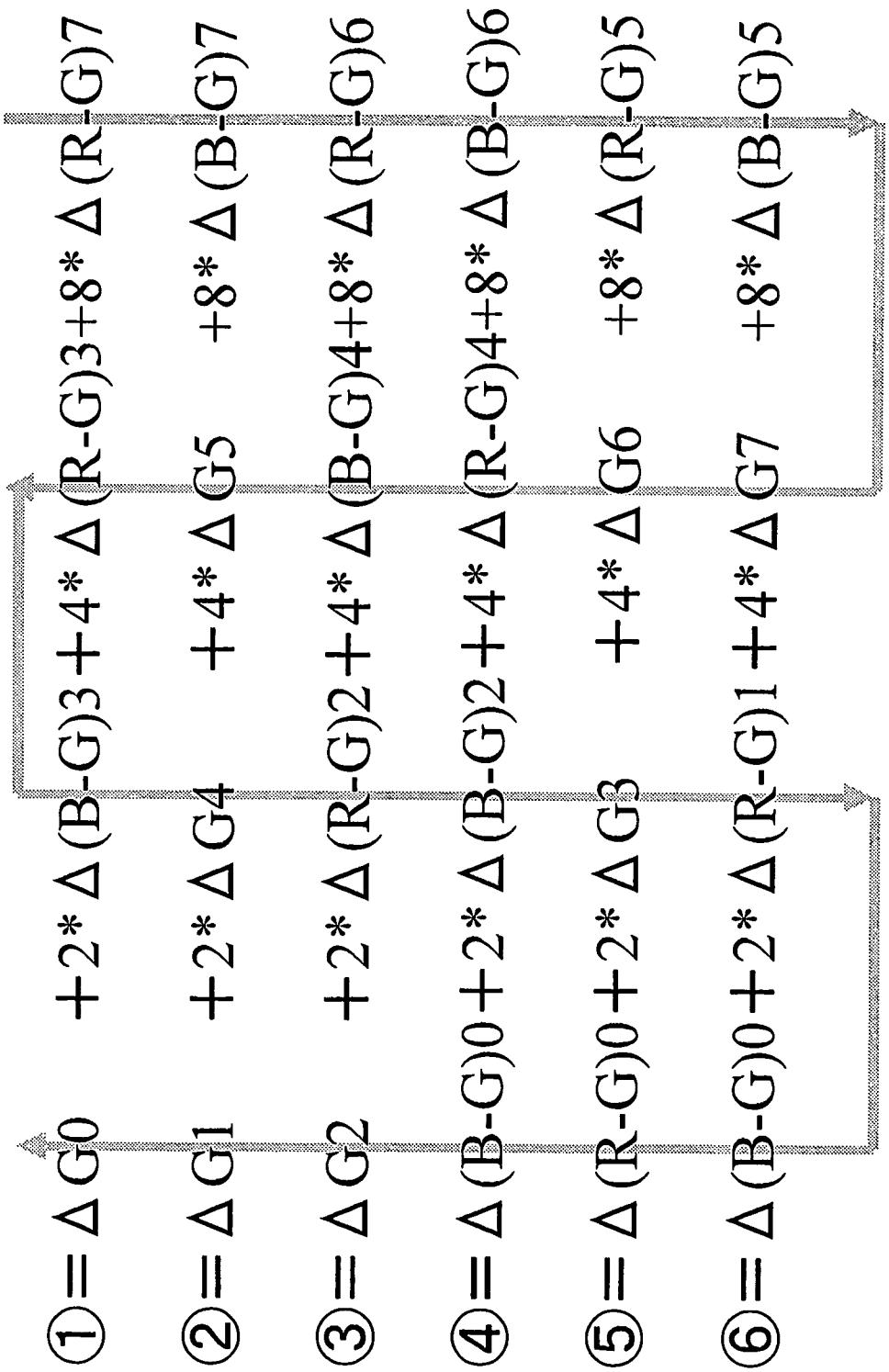
FIG. 32 shows expressions expressing the multi-valuation map C according to the expressions (30) to (35).

As another embodiment of the multi-valuation, the 16-valued multi-valuation map based on the MED as an example of DPCM in FIG. 19 will be explained below. The difference below means the MED difference. FIG. 32 shows the multi-valuation map C according to the expressions (30) to (35). By using the map C, 12 pairs of the wirings are reduced to three pairs of the wirings (1/4).

For the above multi-valuation map of FIG. 32, the average of the electric current amplitude is estimated by the expression in FIG. 33. The arrows in FIGS. 32 and 33 show the precedence relation of the probability calculated based on the map in FIG. 25: the base of the arrow shows the lowest probability and the tip shows the highest probability.

In FIGS. 32 and 33, the bits Δ are allocated in order in accordance with values of the probability. This order is determined by shape of probability distribution. When the parameter α of the extended Laplacian distribution is changed from 0.3 to 0.4 and 0.5, the order relating to the probability distribution of the multi-valuation map is not greatly affected, as long as the bits are not changed greatly even if the bits are rearranged.

Even when the bit is changed, resultant difference is small in most cases. For example, even if $8*\Delta(R-G)7$ in the expression (30) is swapped with $8*\Delta(B-G)5$ in the expression (35), since the average is finally added as shown in FIG. 32, there is no difference due to the swap as a result. Further, even if $\Delta(B-G)5$ (of $8*\Delta(B-G)5$) is swapped with $\Delta G7$ (of $4*\Delta G7$) in the expression (35) with giving $8*\Delta G7+4*\Delta(B-G)5$, the difference of the average is relatively small compared with its total amplitude.

By the above discussions, it is experientially known that the above multi-valued map is still applicable for the wide range a distribution with permitting a slight increase as a loss. Since both the color differences $\Delta(R-G)$ and $\Delta(B-G)$ have the approximately same value α and ΔG obtains a smaller value α than this α value, the positional order of ΔG is different from the positional order of both $\Delta(R-G)$ and $\Delta(B-G)$: in some cases, ΔG7 appears in later order than $\Delta(R-G)5$ and $\Delta(B-G)5$ because $\phi(\Delta G7)$ is smaller than $\phi(\Delta(R-G)5)$ and $\phi(\Delta(B-G)5)$.

Further, when the distribution of ΔG is not sharp, 9-bit accuracy might be necessary. In this case, the above multi-valuation map can be modified as follows.

| | | |
|---|---|---|
| $8*\Delta(R-G)7+4*\Delta(R-G)3+2*\Delta(B-G)3+\Delta G0$ | | |
| $8*\Delta(B-G)7+4*\Delta G5$ | $+2*\Delta G4$ | $+\Delta G1$ |
| $8*\Delta(R-G)6+4*\Delta(B-G)4+2*\Delta(R-G)2+\Delta G2$ | | |
| $8*\Delta(B-G)6+4*\Delta(R-G)4+2*\Delta(B-G)2+\Delta(B-G)0$ | | |
| $8*\Delta(R-G)5+4*\Delta G6$ | $+2*\Delta G3$ | $+\Delta(R-G)0$ |
| $8*\Delta(B-G)5+4*\Delta G7$ | $+2*\Delta(R-G)1+\Delta(B-G)1$ | |
| $\Delta G8$ | | |

ΔG8 is 9th-bit MSB, and single expression ΔG8 composes a single bit allocation expression to construct the multi-valuation map. In this case, the operating frequency is increased by 7/6 times. A definition including another bit expressions may be given beside the single expression ΔG8 here. For example, a definition may be given as follows. ΔG8 is inserted to the place next to ΔG7, and the value "0" is assigned to empty terms (shown as empty strings in terms) in expressions.

| | | |
|---|---|---|
| | $4*\Delta(B-G)4+2*\Delta G5$ | $+\Delta G0$ |
| | $4*\Delta(R-G)4+2*\Delta(R-G)3+\Delta G1$ | |
| | $4*\Delta G6$ | $+2*\Delta(B-G)3+\Delta G2$ |
| $8*\Delta(R-G)7+4*\Delta G7$ | $+2*\Delta G4$ | $+\Delta(B-G)0$ |
| $8*\Delta(B-G)7+4*\Delta G8$ | $+2*\Delta(R-G)2+\Delta(R-G)0$ | |
| $8*\Delta(R-G)6+4*\Delta(R-G)5+2*\Delta(B-G)2+\Delta(B-G)1$ | | |
| $8*\Delta(B-G)6+4*\Delta(R-G)5+2*\Delta G3$ | $+\Delta(R-G)1$ | |

Further, the consideration may be given in the case that $\Delta(R-G)8$ and $\Delta(B-G)8$ are added as the highest bit (actually, since 8 bits are sufficient for sharp distribution, 9 bits are not necessary).

```
                    4*Δ(B-G)4+2*ΔG5        +ΔG0
8*Δ(R-G)8+4*Δ(R-G)4+2*Δ(R-G)3+ΔG1
8*Δ(B-G)8+4*ΔG6         +2*Δ(B-G)3+ΔG2
8*Δ(R-G)7+4*ΔG7         +2*ΔG4       +Δ(B-G)0
8*Δ(B-G)7+4*ΔG8         +2*Δ(R-G)2+Δ(R-G)0
8*Δ(R-G)6+4*Δ(B-G)5+2*Δ(B-G)2+Δ(B-G)1
8*Δ(B-G)6+4*Δ(R-G)5+2*ΔG3        +Δ(R-G)1
```

Further modification of map will be given if needed just like as the addition of functionality in the above way. Next, consider the case of addition of control signal SIG, that has low 1-occurrence probability such as 1H sync signal. The bit SIG is inserted as the term 8*SIG in the first expression as follows:

```
8*SIG           +4*Δ(B-G)4+2*ΔG5        +ΔG0
8*Δ(R-G)8+4*Δ(R-G)4+2*Δ(R-G)3+ΔG1
8*Δ(B-G)8+4*ΔG6         +2*Δ(B-G)3+ΔG2
8*Δ(R-G)7+4*ΔG7         +2*ΔG4       +Δ(B-G)0
8*Δ(B-G)7+4*ΔG8         +2*Δ(R-G)2+Δ(R-G)0
8*Δ(R-G)6+4*Δ(B-G)5+2*Δ(B-G)2+Δ(B-G)1
8*Δ(B-G)6+4*Δ(R-G)5+2*ΔG3        +Δ(R-G)1
```

In this embodiment, DPCM generates a differential data of images at first, then the differential data is encoded by the "channel bit generation map" and the "multi-valuation map", and finally its encoded data is transmitted as multi-valued electric signal (a physical quantity such as current amplitude or voltage amplitude). In such a manner, the multi-valued transmission is coded on the channel. In this sense, the technology of the inventors can be called as "multi-valued channel coding technology".

FIG. 34 is a diagram illustrating results of simulation of various images using the 16-valued multi-valuation map shown in FIG. 32. FIGS. 35 to 42 are diagrams illustrating distribution data of the image set A, B, C, D, E, F and G shown in FIG. 34.

Devices using an image are listed in a vertical direction in the table of FIG. 34, and types of images are listed in a horizontal direction. TV, PC, camera and cellular phone are given in the vertical direction as typical devices, but another devices may be used.

As to the analyzed results of FIGS. 35 to 41, the calculation is performed with unit of the reference current amplitude I. For example in the results of FIG. 35, average value is about 0.18 and a sigma value (standard deviation) is about 0.06 measured with unit of the reference current amplitude I. In the calculation of current in FIG. 34, the reference electric current amplitude for single pair of wirings is typically given as 4 mA. Further, ADC is assumed as a parallel type, and 10 μA is assumed to be a unit current amplitude for ADC, so that the estimation is 2.2 mA.

5 μA+15 μA+25 μA+ . . . +155 μA=2 mA is necessary for a reference electric current amplitude of a comparator. 2 mA/10 is necessary as current amplitude on the output side of the transistor of amplifier. As a result, a total of the average current amplitude is estimated approximately 1/10.

For example, in the case where single pair of wirings requires 2I (I=4 mA: reference electric current amplitude), (2*4+2.2)*3 pairs=30.6 mA is estimated. In the case of the conventional binary valuation, the occurrence probabilities of 0 and 1 are 0.5 respectively for 12 pairs, then the conventional electric current amplitude is estimated to 24 mA=4 mA*0.5*12 pairs. Remember that the electric current amplitude is 30.6 mA for the case where the count of the wirings is reduced from 12 pairs (24 wirings) to 3 pairs (6 wirings). The individual analyses on specific image set will be explained successively as follows.

Consider that cinema movies, TV-shows, animated cartoon and the like are treated to analyze, and also consider that the images to be analyzed have MPEG2 quality. Not only current SDTV (Standard Definition TV) but also HDTV adopts MPEG2. Natural images of MPEG4 have the format of MPEG2, and this MPEG2 image of "Intra-picture frame" has the largest size of information in MPEG4 images.

Figure 36:
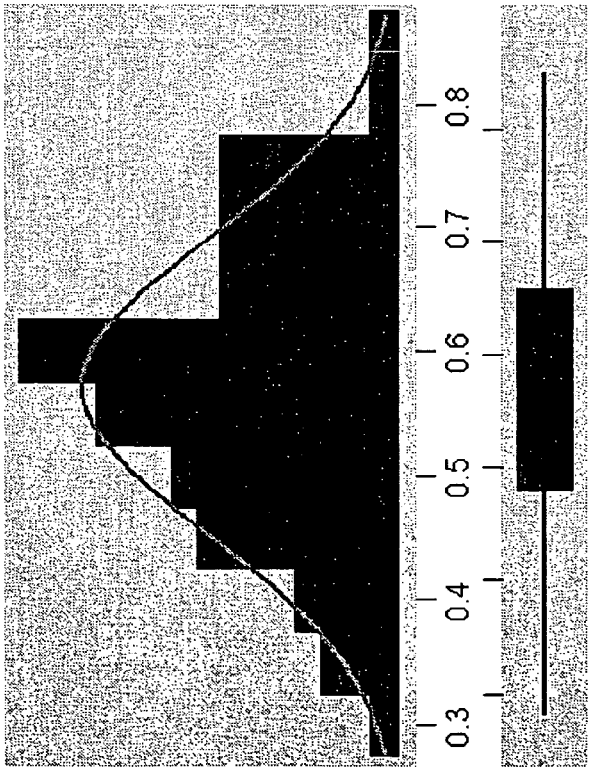
FIG. 36 is a diagram showing distribution of image set B.

Actually, we run a simulation for the image data that are sub-sampled at 4:2:0 based on the main profile and the main level of MPEG2. MPEG2 is already used in DVD and MPEG2 is widely accepted not only at present but also will be in future. For the application of TV, the image set B is analyzed as the image data set of the natural image. The statistic of this result is shown in FIG. 36. The image set A is image data in DVD, and has size of 720×480.

Since the average μ is given as 0.57, a calculation is performed: $(4\ mA*0.57+2.2)*3=13.4\ mA$. This value is 59% of the conventional value of 24 mA. This suggests that even when the count of the wirings is reduced to 1/4, the average electric current amplitude is reduced by about 40%.

If the statistical property is not utilized, when adopting a simple realization of 16 values (0 to 15 values are used), then 4 mA*15*0.5*3 pairs=90 mA. This value is an extremely large value in comparison with 24 mA: 90 mA is 6.7 times as large as 13.4 mA.

The label "Indoor, people" is attached in the table of FIG. 34 because the TV-shows are mainly analyzed as the data that include many human figures in the house or studio set. An image set C is an image data set of a certain movie. FIG. 37 shows the statistic of the analyzed results.

An image set D is another image data set of a TV show. FIG. 38 shows the statistic of the analyzed results. An image set D mostly includes conversation scenes in room, but includes also a small number of conversation scenes in natural scenic site. The image set C mostly includes scenes in room.

An image set E is an image data set of a certain animated cartoon. FIG. 39 shows the statistic of the analyzed results. Images of the animated cartoon are expected to be simple and thus better results may be expected, but actually they are not greatly different from other TV images. This is because: when the images of the animated cartoon are magnified, the slight gradation is visible, even in the pixels expected to be painted in uniform way, and thus the images are not painted uniformly by single color.

Like simple painting software of PC, in the case where images are daubed simply, the results seems to give the close value to the value of the image set A, but the images of the animated cartoon broadcasted on TV are not so simple images as expected.

According to the results of the image data sets of the image sets A to G, the average of electric current amplitude is reduced by about 50% to 70%, and thus the electric current amplitude can be simultaneously reduced very effectively. Needless to say, since the device is not limited to the image display devices in the list, it is noted that the reduction can be applied to LCD-TV, PDP-TV and the like. Particularly in portable devices, the reduction in the count of the wirings is important.

Figure 35:
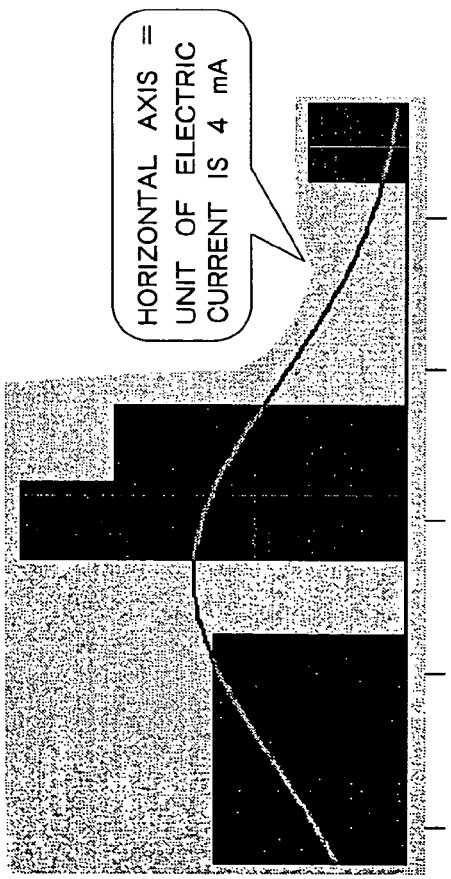
FIG. 35 is a diagram showing distribution of image set A.

The analyses on applications in PC will be explained below. The image set A is a data set of images where invoking various software applications. FIG. 35 shows the statistical results of the analysis.

The image set A is an example of an operation screen on PC where the inventors usually operate. The average is 0.18 measured by the reference unit of current amplitude, and its value is extremely small, and the average of electric current amplitude is 8.8 mA as physical quantity. The correlation of the PC operation screen is high, and thus such a satisfactory value can be generally expected.

Since images photographed by digital cameras are often viewed in PC recently, an image set H is provided for these applications. It may be not so often to view such images in actual PC. This degree of frequency greatly depends on individual users, but it is not expected so often for inventor as primary usage. Further, the results are described by referring to the image set C and the image set D. Watching TV programs on PC might occur more often in the future. High brightness is the premise for TV application, and PC does not have high brightness at the present time, but further improvements on brightness will be expected in future. The same discussion is true also for the animated cartoon.

An image set F includes image data of showpieces in a museum. FIG. 40 shows the statistic of analyzed results.

A background scene of picture is so simple that the showpieces in the museum are clearly identified in images. As a result, the correlation is improved to be high, and thus the average of electric current amplitude is reduced. It is a general expectation that correlation is not changed basically even if the size of image increases. This is known as the invariant property with respect to image size. Actually, consider the case that the size of image for the identical landscape is changed (the case that its size is increased). As the size of image increases, the correlation is slightly improved. This tendency is experimentally verified for many images. From this experience, even in the case of the high definition images including such as art objects to be vividly presented and the like, the correlation will be improved: the increase of image size improve the performance a little. This implies the reduction of average of current amplitude.

An image set H is data collection taken from a photo book in a CD-ROM, and includes natural images. FIG. 42 shows the statistic of analyzed results. An image of dry leaves has the lowest correlation in the image set H. The image of accumulated dry leaves contains many edges. For this reason, even if MED is used (MED is proposed by Edirisinghe to treat the diagonal edge more properly), the result is unexpectedly poor by the so often mismatches of predicted value and actual value. Further, the data set of an image set G are data collection taken from a photo book in a CD-ROM, and includes image data of landscapes in U.S.A (largely of sightseeing areas). FIG. 41 shows the statistic of analyzed results.

It is a primary objective here to transmit data to an image display device, and it is not desirable from a viewpoint of the cost in including a DCT signal-processing unit for JPEG as the data compressing on an image driver. The attention should be paid on the merit that the technique by the inventors of the present invention is advantageous in this cost viewpoint. The image sets B, C, D and E (as the data set on TV) are used also as to-be-analyzed images for a camera, using which moving image of MPEG 2 is taken.

Regarding on a cellular phone, since a "moving image in cellular" is promoted towards the future, not only the data set of the image sets F, G and H but also the image set C, D and E on TV shall be images to be analyzed. An image set "A" of operation images on a PC screen is still basically important.

By considering that watching TV images in cellular phone spends comparatively longer time than conventional usage, it is advantageous that the results show the average of electric current amplitude is suppressed by about 50%. The flexibility of a hinge (mechanically connected revolvable portion) is important in the cellar phones. If the wirings are bundled widely, it is a serious problem. For this reason, it is very effective of our results that the count of the wirings can be reduced to 1/4. Particularly in the technology by the inventors, circuits are devised in compatible with the conventional interfaces. In addition, with keeping the operating frequency low, a small count of data wirings can be realized. When considering the further increase in the size of image in future, there is a concern that it will be difficult to realize a small count of wirings with only by means of some devising on circuits. From this concern, the technology on the entropy-coded multi-valued transmission by the inventors is prerequisite and unavoidable in future.

The property of the image data changes according to application of data. As it is expected that TV and PC will continue to get popularity for a long time in future and portable electronic devices will be penetrated further, FIG. 34 suggests that the present invention has the advantageous industrial impact.

In all of the above explanation, the detailed techniques mainly have been described based on MED color difference as the statistical deviation of images. It is easily understood that any statistics may play a replaceable role to exploit, as long as the generalized technical idea from the inventors that exploits the statistical deviation of other predictor. From this understanding, the statistic deviation in the adaptive predictive coding used in the technique such as JPEG-LS is naturally foreseeable.

The introduction of not only the GAP predictor but also the predictor enhanced by context modeling can be easily foreseeable from the technical idea of the inventors. It is easily expected that prediction can be performed not only by using 1H or 2H memory images but also by using frame memory images.

Further, the above explanation has been given on the assumption that image data are transmitted mainly to display devices. It is important to understand that the present invention relates generally to image data transmission. In order to make this understanding more clear, another embodiment will be explained. The present invention is applicable to the case where image data captured by CCD are transmitted to a processor from CCD. The present invention will reduce the count of wirings for image data from CCD to processor.

As another embodiment, image data transmission on a memory interface will be foreseen below. For example, it is a publicly known technology that 256-valued data are transmitted between memories. In this technology, data are assumed to be general, but particularly image data are not expected. The present technique can effectively suppress power consumption by the restriction of general data to image data (memory for image processing). When considering the general fact that size of image data is overwhelmingly larger than that of another type of data (non image data), another type of data is negligible. For this reason, the present technique is expected to be effective in the many cases where type of data is not restricted to image data. As a result, it is not necessary to restrict the application of the present invention to image processing. The required condition to apply the discussion is that the primary contents of data are image. Thus, the discussion is true not only in memories but also in other general transmission.

Still another embodiment will be foreseen. For example, the present invention can be applied also to the case where image data as a result of CG processing such as rendering are transmitted to a display controller. The image data are not necessarily limited particularly to ones that undergo the rendering process. When an image is output from the processor, image data are transmitted/received to/from an external device such as a memory, there is a request to reduce the count of interface wirings. The present invention is effective not only in the case where image data are transmitted to a driver of an display device but also in the case where image data are transmitted generally in various types of interfaces.

Multimedia data are used very often at the present day, and in its multimedia data image data has the largest load. A size of text data is extremely smaller than that of image data, so text data is negligible to transmit. The image data transmission by using the present invention should not be understood simply as solution to the problem of a display device in a limited way. The proposed image data transmission is expected to play a very important role in multimedia devices, particularly in portable multimedia devices.

In the embodiment, the DPCM technology and the multi-valuation technology have been bridged based on the "multi-valuation map". Since the multi-valued data obtained by multi-valuation of image data are transmitted via a small count of wirings, the count of the wirings can be greatly reduced. Since the multi-valuation exploits the statistical property of image, the current consumption can be suppressed in a similar or more degree than the conventional techniques.

What is claimed is:

1. An image transmitter, comprising:
a color difference differential calculating unit configured to calculate color difference differential data relating to a difference between a current predicting value predicted based on a previous image data and current actual image data;
a coding unit configured to code the color difference differential data to generate coding data;
a multi-valuation unit configured to generate multi-valued data based on the coding data and an appeared probability of the coding data based on statistical properties of the image data; and
a transmitting unit configured to transmit the multi-valued data via at least one transmission line,
wherein the multi-valuation unit multiplies a specific bit value in respective bits of the coding data by coefficients different from each other and adds the multiplied values to each other, to generate the multi-valued data.

2. The image transmitter according to claim 1, wherein the coding unit shortens a bit length of the coding data, as an appeared probability of the color difference differential data becomes higher.

3. The image transmitter according to claim 1, wherein the coefficients are smaller for a lower bit of the coding data.

4. The image transmitter according to claim 1, wherein the multi-valuation unit generates a plurality of the multi-valued data for one pixel, to minimize an average electric current of the multi-valued data.

5. The image transmitter according to claim 1, wherein the multi-valuation unit generates a plurality of the multi-valued data for one pixel; and
the transmitting unit transmits a plurality of the multi-valued data for one pixel via a single transmission line.

6. The image transmitter according to claim 1, wherein the multi-valuation unit generates a plurality of the multi-valued data for one pixel; and the transmitting unit transmits a plurality of the multi-valued data corresponding to one pixel in parallel via a plurality of the transmission lines.

7. An image receiver, comprising:
a receiving unit configured to receive multi-valued data transmitted via at least one transmission line;
a coding unit configured to restore coding data taking statistical properties of image data into consideration, based on the received multi-valued data;
a decrypting unit configured to decrypt the coding data to generate a color difference differential data relating to a difference between a current predicting value predicted based on a previous image data and current actual image data; and
an image restoring unit configured to restore the current actual image data based on the color difference differential signal,
wherein the coding unit receives the multi-valued data obtained by adding values generated by multiplying coefficients different from each other by a specific bit value in responsive bits of the coding data.

8. The image receiver according to claim 7, wherein the coding unit restores the coding data having shorter bit length, as an appeared probability of the differential data is higher.

9. The image receiver according to claim 7, wherein the coefficients are smaller for a lower bit of the coding data.

10. The image receiver according to claim 7, wherein the receiving unit receives a plurality of the multi-valued data for one pixel.

11. The image receiver according to claim 10, wherein the receiving unit receives a plurality of the multi-valued data corresponding to one pixel in serial via one transmission line, or receives the plurality of the multi-valued data in parallel via a plurality of the transmission lines.

12. An image transmission system, comprising:
an image transmitter which transmits image data; and
an image receiver which receives the image data,
wherein the image transmitter includes:
a color difference differential calculating unit configured to calculate color difference differential data relating to a difference between a current predicting value predicted based on a previous image data and current actual image data;
a first coding unit configured to code the color difference differential data to generate coding data;
a multi-valuation unit configured to generate multi-valued data based on the coding data and an appeared probability of the coding data based on statistical properties of the image data; and
a transmitting unit configured to transmit the multi-valued data via at least one transmission line,
the image receiver includes:
a receiving unit configured to receive the multi-valued data transmitted via at least one transmission line;
a second coding unit configured to restore the coding data taking statistical properties of the image data into consideration, based on the received multi-valued data;
a decrypting unit configured to decrypt the coding data to generate the color difference differential data relating to a difference between the current predicting value predicted based on the previous image data and the current actual image data; and an image restoring unit configured to restore the current actual image data based on the color difference differential signal, wherein the multi-valuation unit multiplies a specific bit value in respective bits of the coding data by coefficients different from each other and adds the multiplied values to each other, to generate the multi-valued data.

13. The image transmission system according to claim 12, wherein the coding unit shortens a bit length of the coding data, as the appeared probability of the color difference differential data becomes higher.

14. The image transmission system according to claim 12, wherein the coefficients are smaller for a lower bit of the coding data.

15. The image transmission system according to claim 12, wherein the multi-valuation unit generates a plurality of the multi-valued data for one pixel, to minimize an average of electric current amplitude of the multi-valued data.

16. The image transmission system according to claim 12, wherein the multi-valuation unit generates a plurality of the multi-valued data for one pixel; and the transmitting unit transmits a plurality of the multi-valued data for one pixel via a single transmission line.

17. The image transmission system according to claim 12, wherein the multi-valuation unit generates a plurality of the multi-valued data for one pixel; and the transmitting unit transmits a plurality of the multi-valued data corresponding to one pixel in parallel via a plurality of the transmission lines.

\* \* \* \* \*